US010171842B2

(12) United States Patent
Hendry et al.

(10) Patent No.: US 10,171,842 B2
(45) Date of Patent: Jan. 1, 2019

(54) HRD DESCRIPTOR AND BUFFER MODEL OF DATA STREAMS FOR CARRIAGE OF HEVC EXTENSIONS

(71) Applicant: QUALCOMM Incorporated, San Diego, CA (US)

(72) Inventors: Fnu Hendry, San Diego, CA (US); Ye-Kui Wang, San Diego, CA (US); Adarsh Krishnan Ramasubramonian, Irvine, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/971,373

(22) Filed: May 4, 2018

(65) Prior Publication Data

US 2018/0255324 A1 Sep. 6, 2018

Related U.S. Application Data

(63) Continuation of application No. 14/883,256, filed on Oct. 14, 2015.
(Continued)

(51) Int. Cl.
*H04N 19/70* (2014.01)
*H04N 19/44* (2014.01)
(Continued)

(52) U.S. Cl.
CPC ......... *H04N 19/70* (2014.11); *H04L 65/4069* (2013.01); *H04N 19/30* (2014.11);
(Continued)

(58) Field of Classification Search
None
See application file for complete search history.

(56) References Cited

U.S. PATENT DOCUMENTS 5,930,390 A 7/1999 Coelho
7,343,037 B1 3/2008 Kadatch
(Continued)

FOREIGN PATENT DOCUMENTS

WO 2015105934 A1 7/2015

OTHER PUBLICATIONS

Boyce, et al., "Draft high efficiency video coding (HEVC) version 2, combined format range extensions (RExt), scalability (SHVC), and multi-view (MV-H EVC) extensions," Jun. 30-Jul. 9, 2014; (Joint Collaborative Team on Video Coding of ISO/IEC JTC1/SC29/WG11 and ITU-T SG.16); doc. No. JCTVC-R1013_v6, 545 pp.
(Continued)

*Primary Examiner* — Mohammad J Rahman
(74) *Attorney, Agent, or Firm* — Shumaker & Sieffert, P.A.

(57) ABSTRACT

A video processing device obtains a data stream comprising a plurality of elementary streams and a High Efficiency Video Coding (HEVC) timing and Hypothetical Reference Decoder (HRD) descriptor. The HEVC timing and HRD descriptor comprises a target schedule index syntax element indicating an index of a delivery schedule. The video processing device may identify, based on a set of parameters, a syntax element in an array of syntax elements in a video parameter set (VPS). The set of parameters may comprise a parameter having a value equal to a value of the target schedule index syntax element. The video processing device may identify, based on an index specified by the identified syntax element, a particular HRD parameters syntax structure in a plurality of HRD parameters syntax structures as being applicable to a particular elementary stream.

28 Claims, 7 Drawing Sheets

Related U.S. Application Data

(60) Provisional application No. 62/064,414, filed on Oct. 15, 2014.

(51) Int. Cl.
    *H04L 29/06*     (2006.01)
    *H04N 19/423*     (2014.01)
    *H04N 19/30*     (2014.01)
    *H04N 21/2343*     (2011.01)
    *H04N 21/24*     (2011.01)

(52) U.S. Cl.
    CPC .......... *H04N 19/423* (2014.11); *H04N 19/44* (2014.11); *H04N 21/234327* (2013.01); *H04N 21/2401* (2013.01)

(56) References Cited

U.S. PATENT DOCUMENTS

| | | | |
|---|---|---|---|
| 9,558,567 B2 | 1/2017 | Guo et al. | |
| 2014/0086333 A1* | 3/2014 | Wang | H04N 19/70 375/240.25 |
| 2014/0267283 A1 | 9/2014 | Nystad et al. | |
| 2015/0003529 A1 | 1/2015 | Thirumalai et al. | |
| 2015/0186100 A1 | 7/2015 | Tsai et al. | |
| 2015/0195578 A1* | 7/2015 | Chen | H04N 21/234327 375/240.26 |
| 2015/0264365 A1 | 9/2015 | Tsai et al. | |
| 2016/0105688 A1 | 4/2016 | Hendry et al. | |
| 2016/0112724 A1 | 4/2016 | Hendry et al. | |
| 2016/0286217 A1 | 9/2016 | Hsiang | |
| 2016/0323591 A1 | 11/2016 | Chuang et al. | |

OTHER PUBLICATIONS

Bross B., et al., "High Efficiency Video Coding (HEVC) text specification draft 10 (for FDIS & Consent)," Joint Collaborative Team on Video Coding (JCT-VC) of ITU-T SG 16 WP 3 and ISO/IEC JTC 1/SC 29/WG 11, Document: JCTVC-L1003_v34, 12th Meeting: Geneva, CH, Jan. 14-23, 2013, 310 pages.

Bross, B., et al., "High efficiency video coding (HEVC) text specification draft 7," Joint Collaborative Team on Video Coding (JCT-VC) of ITU-T SG16 WP3 and ISO/IEC JTC1/SC29/WG11 9th Meeting: Geneva, CH, Apr. 27, 2012-May 7, 2012, JCTVC-I1003_d2, XP030112373, (May 10, 2012), pp. 1-290.

Bross B., et al., "High Efficiency Video Coding (HEVC) text specification draft 8", 10. JCT-VC Meeting; 101. MPEG Meeting; Jul. 11, 2012-Jul. 20, 2012; Stockholm; (Joint Collaborative Team on Video Coding of ISO/IEC JTC1/SC29/WG11 and ITU-T SG.16); URL: http://wftp3.itu.int/av-arch/jctvc-site/,, No. JCTVC-J1003_d7, Jul. 23, 2012 (Jul. 23, 2012), XP030112947, 260 Pages.

Bross, et al., "High Efficiency Video Coding (HEVC) Text Specification Draft 6," JCTVC-H1003, Joint Collaborative Team on Video Coding (JCT-VC) of ITU-T SG16 WP3 and ISO/IEC JTC1/SC29/WG11, 8th Meeting: San José, CA, USA, Feb. 1-10, 2012, 259 pp.

Bross, et al., "High Efficiency Video Coding (HEVC) Text Specification Draft 9", Joint Collaborative Team on Video Coding (JCT-VC) of ITU-T SG16 WP3 and ISO/IEC JTC1/SC29/WG11, JCTVC-K1003_v7, 11th Meeting: Shanghai, CN, Oct. 10-19, 2012 , 290 pp.

Bross, et al., "WD4: Working Draft 4 of High-Efficiency Video Coding," JCTVC-F803 d2, (JCT-VC) of ITU-T SG16 WP3 and ISO/IEC JTC1/SC29/WG11 Joint Collaborative Team on Video Coding, 6th Meeting, Torino, IT, Jul. 14-22, 2011, 226 pp.

Bross, et al., "WD5: Working Draft 5 of High-Efficiency Video Coding," JCTVC-G1103_d2, (JCT-VC) of ITU-T SG16 WP3 and ISO/IEC JTC1/SC29/WG11 Joint Collaborative Team on Video Coding, 7th Meeting, Geneva, Switzerland (Nov. 2011), 214 pages.

Chen, et al., "High efficiency video coding {HEVC) scalable extension Draft 7," JCT-Meeting; Jun. 30-Jul. 9, 2014; Joint Collaborative Team on Video Coding of ISO/IEC JTC1/SC29/WG11 and ITU-T SG.16 ); No. JCTVC-R1008_v7, Oct. 1, 2014; 175 pp.

Gruneberg K., et al., "Text of ISO/IEC 13818-1:2013/FDAM 3 Carriage of HEVC video over MPEG-2 Systems", 105. MPEG Meeting; Jul. 29, 2013-Aug. 2, 2013; Vienna; (Motion Picture Expert Group or ISO/IEC JTC1/SC29/WG11) No. N13656, XP030020404, Sep. 6, 2013 (Sep. 6, 2013), 17 pages.

Gruneberg K., et al., "Study Text of ISO-IEC_13818-1_2013_PDAM7_Carriage_of_Lay ered_HEVC," 109. Mpeg Meeting; Jul. 7, 2014-Jul. 11, 2014; Sapporo; (Motion Picture Expert Group or ISO/IEC JTC1/SC29/WG11),, No. m34544, Jul. 9, 2014 (Jul. 9, 2014), XP030062917.

Hendry et al., "On Buffer Model and HEVC Timing and HRD Descriptor," 110, Mpeg Meeting; 20-10-201 Oct. 24, 2014; Strasbourg; (Motion Picture Expert Group or ISO/IEC JTC1/SC29/WG11) No. m34998, Oct. 15, 2014 (Oct. 15, 2014), XP030063370.

"HighEfficiency Video Coding; H.265 (04/13)", ITU-T Standard, InternationalTelecommunication Union, Geneva ; CH, No. H.265 (04/13), Apr. 13, 2013(Apr. 13, 2013), pp. 1-317, XP044008743, [retrieved on Jun. 6, 2013].

"Information technology—Generic Coding of Moving Pictures and Associated Audio Information: Systems; H.222.0 (10/14)", ITU-T Standard, International Telecommunication Union, Geneva ; CHno. H.222.0 (10/14), Oct. 14, 2014 (Oct. 14, 2014), pp. 1-246,XP044008880, [retrieved on Jan. 16, 2015].

International Preliminary Report on Patentability for corresponding PCT Application No. PCT/US2015/055712 dated Jan. 23, 2017, 10 pp.

Internationalsearch Report and Written Opinion—PCT/US2015/055712—ISA/EPO—dated Jan. 18, 2016.

ITU-T H.264, Series H: Audiovisual and Multimedia Systems, Infrastructure of audiovisual services—Coding of moving video, Advanced video coding for generic audiovisual services, The International Telecommunication Union. Jun. 2011, 674 pp.

ITU-T H.265, Series H: Audiovisual and Multimedia Systems, Infrastructure of audiovisual services—Coding of moving video, High efficiency video coding, The International Telecommunication Union, Apr. 2013, 317 pages.

ITU-T H.265, Series H: Audiovisual and Multimedia Systems, Infrastructure of audiovisual services—Coding of moving video, High efficiency video coding, The International Telecommunication Union, Apr. 2015, 634 pp.

ITU-T H.265, Series H: Audiovisual and Multimedia Systems, Infrastructure of audiovisual services—Coding of moving video, High efficiency video coding, The International Telecommunication Union, Oct. 2014, 540 pp.

"Study of ISO/IEC 13818-1:201x/PDAM 3 Carriage of Layered HEVC," MPEG Meeting, Jul. 7, 2014-Jul. 11, 2014; ISO/IEC JTC1/SC29/WG11, No. N14562, XP030021300, Jul. 11, 2014, 29 pages.

Response to Second Written Opinion dated Oct. 17, 2016, from International Application No. PCT/US2015/055712, filed Dec. 15, 2016,39 pp.

Response to Written Opinion dated Jan. 18, 2016, from International Application No. PCT/US2015/055712, filed Aug. 15, 2016, 7 pp.

Second Written Opinion from International Application No. PCT/US2015/055712, dated Oct. 17, 2016, 8 pp.

Tech, et al., "MV-HEVC Draft Text 9," Jul. 3-9, 2014; (Joint Collaborative Team on Video Coding of ISO EC JTC1/SC29/WG11 and ITU-T SG.16); doc No. JCT3V-I1002_v7, 175 pp.

Wiegand, T., et al., "WD2: Working Draft 2 of High-Efficiency Video Coding", Jan. 28, 2011, No. JCTVC-D503, Jan. 28, 2011 (Jan. 28, 2011), XP002679642, Retrieved from the Internet: URL: http://wftp3.itu.int/av-arch/jctvc-site/2011_01_D_Daegu/ [retrieved on Jul. 11, 2012], 153 pp.

Wiegand, T., et al., "WD3: Working Draft 3 of High-Efficiency Video Coding," Document JCTVC-E603, 5th Meeting: Geneva, CH, Mar. 16-23, 2011, 160 pages.

Wiegand T., et al.,"WD1: Working Draft 1 of High-Efficiency Video Coding", JCTVC-C403, Joint Collaborative Team on Video Coding

(56) References Cited

OTHER PUBLICATIONS (JCT-VC), of ITU-T SG16 WP3 and ISO/IEC JTC1/SC29/WG11, 3rd Meeting: Guangzhou, CN, Oct. 7-15, 2010, 137 pp.

* cited by examiner

HRD DESCRIPTOR AND BUFFER MODEL OF DATA STREAMS FOR CARRIAGE OF HEVC EXTENSIONS

This application is a continuation of U.S. application Ser. No. 14/883,256, filed Oct. 14, 2015, which claims the benefit of U.S. Provisional Application No. 62/064,414, filed Oct. 15, 2014, the entire content of which is incorporated by reference.

TECHNICAL FIELD

This disclosure relates to video encoding and decoding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video compression techniques, such as those described in the standards defined by MPEG-2, MPEG-4, ITU-T H.263, ITU-T H.264/MPEG-4, Part 10, Advanced Video Coding (AVC), the High Efficiency Video Coding (HEVC) standard, and extensions of such standards. The video devices may transmit, receive, encode, decode, and/or store digital video information more efficiently by implementing such video compression techniques.

Video compression techniques perform spatial (intra-picture) prediction and/or temporal (inter-picture) prediction to reduce or remove redundancy inherent in video sequences. For block-based video coding, a video slice (i.e., a video frame or a portion of a video frame) may be partitioned into video blocks. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames.

Spatial or temporal prediction results in a predictive block for a block to be coded. Residual data represents pixel differences between the original block to be coded and the predictive block. An inter-coded block is encoded according to a motion vector that points to a block of reference samples forming the predictive block, and the residual data indicates the difference between the coded block and the predictive block. An intra-coded block is encoded according to an intra-coding mode and the residual data. For further compression, the residual data may be transformed from the pixel domain to a transform domain, resulting in residual coefficients, which then may be quantized.

SUMMARY

In general, this disclosure relates to the design of a descriptor for signaling Hypothetical Reference Decoder (HRD) related information and the design of a buffer model of MPEG-2 Transport Stream (TS) for carriage of HEVC extensions. As described herein, a video processing device may determine a set of HRD parameters applicable to an elementary stream in a Motion Picture Experts Group (MPEG)-2 data stream.

In one aspect, this disclosure describes a method of processing video data, the method comprising: obtaining a data stream comprising a plurality of elementary streams and a High Efficiency Video Coding (HEVC) timing and Hypothetical Reference Decoder (HRD) descriptor, wherein the HEVC timing and HRD descriptor comprises a target schedule index syntax element indicating an index of a delivery schedule; identifying, based on a set of parameters, a syntax element in an array of syntax elements in a video parameter set (VPS), wherein: the VPS comprises a plurality of HRD parameters syntax structures, wherein each respective HRD parameters syntax structure of the plurality of HRD parameters syntax structures comprises a respective set of HRD parameters, each respective syntax element of the array of syntax elements specifies an index of an HRD parameters syntax structure in the plurality of HRD parameters syntax structures, and the set of parameters comprises a parameter having a value equal to a value of the target schedule index syntax element; and identifying, based on an index specified by the identified syntax element, a particular HRD parameters syntax structure in the plurality of HRD parameters syntax structures as being applicable to a particular elementary stream that is part of the operation point, the plurality of elementary streams including the particular elementary stream.

In another aspect, this disclosure describes a method of processing video data, the method comprising: generating a video parameter set (VPS) that includes an array of syntax elements and a plurality of Hypothetical Reference Decoder (HRD) parameters syntax structures, wherein: each respective HRD parameters syntax structure of the plurality of HRD parameters syntax structures comprises a respective set of HRD parameters, and each respective syntax element of the array of syntax elements specifies an index of an HRD parameters syntax structure in the plurality of HRD parameters syntax structures; generating a High Efficiency Video Coding (HEVC) timing and HRD descriptor comprising a target schedule index syntax element indicating an index of a delivery schedule; and generating a data stream comprising a plurality of elementary streams and the High Efficiency Video Coding (HEVC) timing and HRD descriptor, wherein a set of parameters identifies a syntax element in the array of syntax elements that specifies an index of a particular HRD parameters syntax structure applicable to the particular elementary stream, the particular HRD parameters syntax structure being one of the plurality of HRD parameters syntax structures, the particular HRD parameters syntax structure being part of an operation point, the set of parameters comprises a parameter having a value equal to a value of the target schedule index syntax element.

In another aspect, this disclosure describes a device for processing video data, the device comprising: a memory configured to store the video data; and one or more processors configured to: obtain a data stream comprising a plurality of elementary streams and a High Efficiency Video Coding (HEVC) timing and Hypothetical Reference Decoder (HRD) descriptor, wherein the HEVC timing and HRD descriptor comprises a target schedule index syntax element indicating an index of a delivery schedule, the elementary streams comprising encoded representations of the video data; identify, based on a set of parameters, a syntax element in an array of syntax elements in a video parameter set (VPS), wherein: the VPS comprises a plurality of HRD parameters syntax structures, wherein each respective HRD parameters syntax structure of the plurality of HRD parameters syntax structures comprises a respective set of HRD parameters, each respective syntax element of the array of syntax elements specifies an index of an HRD parameters syntax structure in the plurality of HRD parameters syntax structures, and the set of parameters comprises a parameter having a value equal to a value of the target schedule index syntax element; and identify, based on an index specified by the identified syntax element, a particular HRD parameters syntax structure in the plurality of HRD parameters syntax structures as being applicable to a particular elementary stream that is part of the operation point, the plurality of elementary streams including the particular elementary stream.

In another aspect, this disclosure describes a device for processing video data, the device comprising: a memory configured to store the video data; and one or more processors configured to: generate a video parameter set (VPS) that includes an array of syntax elements and a plurality of Hypothetical Reference Decoder (HRD) parameters syntax structures, wherein: each respective HRD parameters syntax structure of the plurality of HRD parameters syntax structures comprises a respective set of HRD parameters, and each respective syntax element of the array of syntax elements specifies an index of an HRD parameters syntax structure in the plurality of HRD parameters syntax structures; generate a High Efficiency Video Coding (HEVC) timing and HRD descriptor comprising a target schedule index syntax element indicating an index of a delivery schedule; and generate a data stream comprising a plurality of elementary streams and the High Efficiency Video Coding (HEVC) timing and HRD descriptor, the plurality of elementary streams comprising an encoded representation of the video data, wherein a set of parameters identifies a syntax element in the array of syntax elements that specifies an index of a particular HRD parameters syntax structure applicable to the particular elementary stream, the particular HRD parameters syntax structure being one of the plurality of HRD parameters syntax structures, the particular HRD parameters syntax structure being part of an operation point, the set of parameters comprises a parameter having a value equal to a value of the target schedule index syntax element.

In another aspect, this disclosure describes a device for processing video data, the device comprising: means for obtaining a data stream comprising a plurality of elementary streams and a High Efficiency Video Coding (HEVC) timing and Hypothetical Reference Decoder (HRD) descriptor, wherein the HEVC timing and HRD descriptor comprises a target schedule index syntax element indicating an index of a delivery schedule; means for identifying, based on a set of parameters, a syntax element in an array of syntax elements in a video parameter set (VPS), wherein: the VPS comprises a plurality of HRD parameters syntax structures, wherein each respective HRD parameters syntax structure of the plurality of HRD parameters syntax structures comprises a respective set of HRD parameters, each respective syntax element of the array of syntax elements specifies an index of an HRD parameters syntax structure in the plurality of HRD parameters syntax structures, and the set of parameters comprises a parameter having a value equal to a value of the target schedule index syntax element; and means for identifying, based on an index specified by the identified syntax element, a particular HRD parameters syntax structure in the plurality of HRD parameters syntax structures as being applicable to a particular elementary stream that is part of the operation point, the plurality of elementary streams including the particular elementary stream.

In another aspect, this disclosure describes a device for processing video data, the device comprising: means for generating a video parameter set (VPS) that includes an array of syntax elements and a plurality of Hypothetical Reference Decoder (HRD) parameters syntax structures, wherein: each respective HRD parameters syntax structure of the plurality of HRD parameters syntax structures comprises a respective set of HRD parameters, and each respective syntax element of the array of syntax elements specifies an index of an HRD parameters syntax structure in the plurality of HRD parameters syntax structures; means for generating a High Efficiency Video Coding (HEVC) timing and HRD descriptor comprising a target schedule index syntax element indicating an index of a delivery schedule; and means for generating a data stream comprising a plurality of elementary streams and the High Efficiency Video Coding (HEVC) timing and HRD descriptor, wherein a set of parameters identifies a syntax element in the array of syntax elements that specifies an index of a particular HRD parameters syntax structure applicable to the particular elementary stream, the particular HRD parameters syntax structure being one of the plurality of HRD parameters syntax structures, the particular HRD parameters syntax structure being part of an operation point, the set of parameters comprises a parameter having a value equal to a value of the target schedule index syntax element.

In another aspect, this disclosure describes a computer-readable storage medium having stored thereon instructions that, when executed, cause one or more processors of a device to: obtain a data stream comprising a plurality of elementary streams and a High Efficiency Video Coding (HEVC) timing and Hypothetical Reference Decoder (HRD) descriptor, wherein the HEVC timing and HRD descriptor comprises a target schedule index syntax element indicating an index of a delivery schedule; identify, based on a set of parameters, a syntax element in an array of syntax elements in a video parameter set (VPS), wherein: the VPS comprises a plurality of HRD parameters syntax structures, wherein each respective HRD parameters syntax structure of the plurality of HRD parameters syntax structures comprises a respective set of HRD parameters, each respective syntax element of the array of syntax elements specifies an index of an HRD parameters syntax structure in the plurality of HRD parameters syntax structures, and the set of parameters comprises a parameter having a value equal to a value of the target schedule index syntax element; and identify, based on an index specified by the identified syntax element, a particular HRD parameters syntax structure in the plurality of HRD parameters syntax structures as being applicable to a particular elementary stream that is part of the operation point, the plurality of elementary streams including the particular elementary stream.

In another aspect, this disclosure describes a computer-readable storage medium having stored thereon instructions that, when executed, cause one or more processors of a device to: generate a video parameter set (VPS) that includes an array of syntax elements and a plurality of Hypothetical Reference Decoder (HRD) parameters syntax structures, wherein: each respective HRD parameters syntax structure of the plurality of HRD parameters syntax structures comprises a respective set of HRD parameters, and each respective syntax element of the array of syntax elements specifies an index of an HRD parameters syntax structure in the plurality of HRD parameters syntax structures; generate a High Efficiency Video Coding (HEVC) timing and HRD descriptor comprising a target schedule index syntax element indicating an index of a delivery schedule; and generate a data stream comprising a plurality of elementary streams and the High Efficiency Video Coding (HEVC) timing and HRD descriptor, wherein a set of parameters identifies a syntax element in the array of syntax elements that specifies an index of a particular HRD parameters syntax structure applicable to the particular elementary stream, the particular HRD parameters syntax structure being one of the plurality of HRD parameters syntax structures, the particular HRD parameters syntax structure being part of an operation point, the set of parameters comprises a parameter having a value equal to a value of the target schedule index syntax element.

The details of one or more examples of the disclosure are set forth in the accompanying drawings and the description below. Other features, objects, and advantages will be apparent from the description, drawings, and claims.

DETAILED DESCRIPTION

Figure 1:
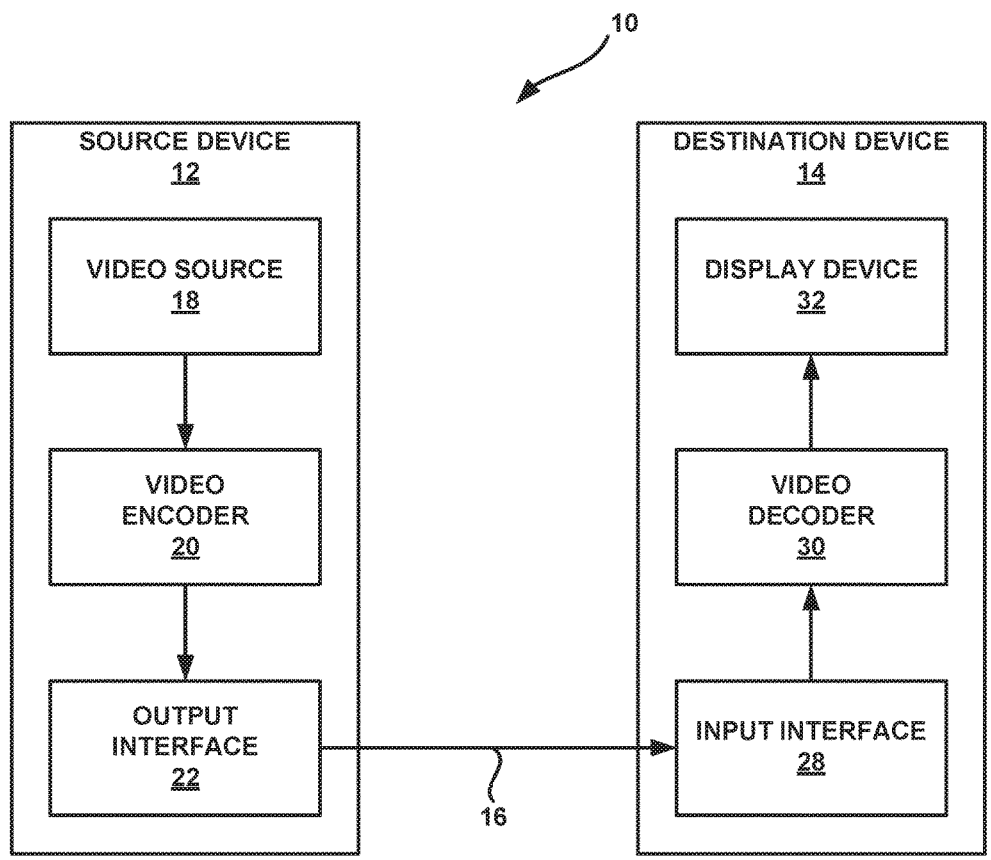
FIG. 1 is a block diagram illustrating an example video coding system that may utilize the techniques described in this disclosure.

Particular video coding standards specify a buffering model, which may be referred to as a Hypothetical Reference Decoder (HRD). The HRD describes how data is to be buffered for decoding and how decoded data is buffered for output. For instance, the HRD describes the operation of a coded picture buffer ("CPB"), a decoded picture buffer ("DPB"), and a video decoding process. The CPB is a first-in first-out buffer containing access units in a decoding order specified by the HRD. The DPB is a buffer holding (e.g., storing) decoded pictures for reference, output reordering, or output delay as specified by the HRD. The behaviors of the CPB and DPB may be mathematically specified. The HRD may directly impose constraints on timing, buffer sizes, and bit rates. Furthermore, the HRD may indirectly impose constraints on various bitstream characteristics and statistics. Though the HRD is named as some kind of decoder, video encoders typically use the HRD to guarantee bitstream conformance, while video decoders typically do not need the HRD. In other words, the HRD is typically used for testing bitstreams. In High Efficiency Video Coding (HEVC), a video parameter set (VPS) contains a set of HRD parameters syntax structures. Each of the HRD parameters syntax structures contains HRD parameters for controlling operation of the HRD.

Scalable HEVC (SHVC) and multi-view HEVC (MV-HEVC) are extensions of HEVC for scalable video coding and multi-view video coding. In SHVC and MV-HEVC, a bitstream may comprise a plurality of layers. Accordingly, SHVC and MV-HEVC may be referred to collectively as "layered HEVC" or "L-HEVC." In SHVC, there is a base layer and one or more enhancement layers. The enhancement layers may increase the visual quality and/or frame rate of video data encoded in the bitstream. In MV-HEVC, each layer may correspond to a different view. Each layer may be associated with a different layer identifier (e.g., nuh_layer_id). In SHVC and MV-HEVC, the layers of a bitstream may be divided into "partitions" according to a partitioning scheme. Thus, each partition may comprise one or more layers of a bitstream. Furthermore, in SHVC and MV-HEVC, each partition may refer to one of the HRD parameters syntax structures in a VPS. Thus, the HRD parameters contained by the HRD parameters syntax structure for a partition may control operation of the HRD when using the HRD to test the partition.

Furthermore, some pictures within a layer may be decoded without reference to other pictures within the same layer. Thus, Network Abstraction Layer (NAL) units encapsulating data of certain pictures of a layer may be removed from the bitstream without affecting the decodability of other pictures in the layer. Removing NAL units encapsulating data of such pictures may reduce the frame rate of the bitstream. A subset of pictures within a layer that may be decoded without reference to other pictures within the layer may be referred to herein as a "sub-layer" or a "temporal sub-layer." NAL units may include temporal_id syntax elements. The temporal_id syntax element of a NAL unit specifies a temporal identifier of the NAL unit. The temporal identifier of a NAL unit identifies a sub-layer with which the NAL unit is associated. Thus, each sub-layer of a bitstream may be associated with a different temporal identifier. If the temporal identifier of a first NAL unit is less than the temporal identifier of a second NAL unit, the data encapsulated by the first NAL unit may be decoded without reference to the data encapsulated by the second NAL unit.

The term "HEVC sub-partition" refers to either an HEVC base sub-partition or an HEVC enhancement sub-partition. The term "HEVC base sub-partition" is an HEVC video sub-bitstream that conforms to the HEVC standard and contains all video coding layer (VCL) NAL units of one or more layers up to a target highest TemporalId identified by a target HEVC operation point of which the target layer identifier list includes the nuh_layer_id value equal to 0. A sub-bitstream (e.g., an HEVC video sub-bitstream) is a bitstream resulting from a process (e.g., a sub-bitstream extraction process) in which NAL units in a bitstream that do not belong to a target set, determined by a target highest TemporalId and a target layer identifier list, are removed from the bitstream, with the output sub-bitstream consisting of the NAL units in the bitstream that belong to the target set. The term "HEVC enhancement sub-partition" refers to one or more HEVC layers, or an HEVC temporal video sub-bitstream or HEVC temporal video subset thereof, of which the HEVC layer aggregation with an HEVC base sub-partition and zero or more other HEVC sub-partitions, according to the layer list of the operation point of the highest layer and highest TemporalId included this video sub-bitstream, results in a valid HEVC layered video stream.

The MPEG-2 Systems specification describes how compressed multimedia (video and audio) data streams may be multiplexed together with other data to form a single data stream suitable for digital transmission or storage. The MPEG-2 Systems specification defines the concept of an elementary stream. Specifically, an elementary stream is a single, digitally coded (possibly MPEG-compressed) component of a program. For example, encoded video or audio part of the program can be an elementary stream. Furthermore, in an extension of the MPEG-2 Systems specification for carriage of HEVC extensions (e.g., L-HEVC), each respective HEVC sub-partition corresponds to a respective elementary stream in an MPEG-2 data stream. Non-Video Coding Layer (VCL) Network Abstraction Layer (NAL) units of L-HEVC video data, such as NAL units containing VPSs, may correspond to one or more elementary streams in an MPEG-2 data stream.

An MPEG-2 data stream may also include a set of descriptors that convey information about a program or component elementary stream of a program. For instance, an MPEG-2 data stream may include for each respective elementary stream corresponding to an HEVC sub-partition, an MPEG-2 data stream may comprise a hierarchy descriptor for the HEVC sub-partition. The hierarchy descriptor for an HEVC sub-partition may include a hierarchy layer index that defines a unique index of the HEVC sub-partition in a table of coding layer hierarchies. Additionally, the set of descriptors may include an HEVC timing and HRD descriptor. The HEVC timing and HRD descriptor may provide applicable timing and HRD parameters.

However, it is not clear in the HEVC standard or the MPEG-2 Systems specification for carriage of HEVC extensions which HRD parameters syntax structure is applicable to which HEVC sub-partition. In other words, it is not specified how to determine which HRD parameters syntax structure to use when using the HRD to test an HEVC sub-partition. Determining which HRD parameters syntax structure is applicable to a sub-partition may be useful because in the HEVC bitstream, when HRD information is present, there can be one or more HRD sets. Furthermore, it may be desirable to determine which HRD parameters syntax structure is applicable to a sub-partition because each of the HRD sets may contain information that are needed for MPEG-2 buffer model.

This disclosure describes techniques for determining applicable HRD parameters syntax structures for HEVC sub-partitions. For instance, as described herein, a video decoder may receive an MPEG-2 data stream comprising a plurality of elementary streams and an HEVC timing and HRD descriptor. The elementary streams may comprise encoded representations of the video data. In this example, the HEVC timing and HRD descriptor comprises a target schedule index syntax element indicating an index of a delivery schedule. Furthermore, the video decoder may identify, based on a set of parameters, a syntax element in an array of syntax elements in a VPS. In this example, the VPS comprises a plurality of HRD parameters syntax structures. Each respective HRD parameters syntax structure of the plurality of HRD parameters syntax structures includes a respective set of HRD parameters. Furthermore, in this example, each respective syntax element of the array of syntax elements specifies an index associated with an HRD parameters syntax structure amongst the plurality of HRD parameters syntax structures. The set of parameters may include a parameter having a value equal to a value of the target schedule index syntax element.

Furthermore, in some examples, the set of parameters may include a first, second, third, fourth, and fifth parameter. The first parameter specifies a target output layer set index of an operation point. The second parameter specifies a target partitioning scheme index of the operation point. The third parameter specifies a highest temporal identifier of the operation point. The video decoder may identify, based on an index specified by the identified syntax element, a particular HRD parameters syntax structure in the plurality of HRD parameters syntax structures as being applicable to a particular elementary stream that is part of the operation point, the plurality of elementary streams including the particular elementary stream.

FIG. 1 is a block diagram illustrating an example video coding system 10 that may utilize the techniques of this disclosure. As used herein, the term "video coder" refers generically to both video encoders and video decoders. In this disclosure, the terms "video coding" or "coding" may refer generically to video encoding or video decoding.

As shown in FIG. 1, video coding system 10 includes a source device 12 and a destination device 14. Source device 12 generates encoded video data. Accordingly, source device 12 may be referred to as a video encoding device or a video encoding apparatus. Destination device 14 may decode the encoded video data generated by source device 12. Accordingly, destination device 14 may be referred to as a video decoding device or a video decoding apparatus. Source device 12 and destination device 14 may be examples of video coding devices or video coding apparatuses. This disclosure may use the term "video processing device" to refer to a device that processes video data. Source device 12 and destination device 14 are examples of video processing devices. Other types of video processing devices include devices that multiplex and demultiplex media data, such as MPEG-2 data streams.

Source device 12 and destination device 14 may comprise a wide range of devices, including desktop computers, mobile computing devices, notebook (e.g., laptop) computers, tablet computers, set-top boxes, telephone handsets such as so-called "smart" phones, televisions, cameras, display devices, digital media players, video gaming consoles, in-car computers, or the like.

Destination device 14 may receive encoded video data from source device 12 via a channel 16. Channel 16 may comprise one or more media or devices capable of moving the encoded video data from source device 12 to destination device 14. In one example, channel 16 may comprise one or more communication media that enable source device 12 to transmit encoded video data directly to destination device 14 in real-time. In this example, source device 12 may modulate the encoded video data according to a communication standard, such as a wireless communication protocol, and may transmit the modulated video data to destination device 14. The one or more communication media may include wireless and/or wired communication media, such as a radio frequency (RF) spectrum or one or more physical transmission lines. The one or more communication media may form part of a packet-based network, such as a local area network, a wide-area network, or a global network (e.g., the Internet). The one or more communication media may include routers, switches, base stations, or other equipment that facilitate communication from source device 12 to destination device 14.

In another example, channel 16 may include a storage medium that stores encoded video data generated by source device 12. In this example, destination device 14 may access the storage medium, e.g., via disk access or card access. The storage medium may include a variety of locally-accessed data storage media such as Blu-ray discs, DVDs, CD-ROMs, flash memory, or other suitable digital storage media for storing encoded video data.

In a further example, channel 16 may include a file server or another intermediate storage device that stores encoded video data generated by source device 12. In this example, destination device 14 may access encoded video data stored at the file server or other intermediate storage device via streaming or download. The file server may be a type of server capable of storing encoded video data and transmitting the encoded video data to destination device 14. Example file servers include web servers (e.g., for a website), file transfer protocol (FTP) servers, network attached storage (NAS) devices, and local disk drives.

Destination device 14 may access the encoded video data through a standard data connection, such as an Internet connection. Example types of data connections may include wireless channels (e.g., Wi-Fi connections), wired connections (e.g., DSL, cable modem, etc.), or combinations of both that are suitable for accessing encoded video data stored on a file server. The transmission of encoded video data from the file server may be a streaming transmission, a download transmission, or a combination of both.

The techniques of this disclosure are not limited to wireless applications or settings. The techniques may be applied to video coding in support of a variety of multimedia applications, such as over-the-air television broadcasts, cable television transmissions, satellite television transmissions, streaming video transmissions, e.g., via the Internet, encoding of video data for storage on a data storage medium, decoding of video data stored on a data storage medium, or other applications. In some examples, video coding system 10 may be configured to support one-way or two-way video transmission to support applications such as video streaming, video playback, video broadcasting, and/or video telephony.

Video coding system 10 illustrated in FIG. 1 is merely an example and the techniques of this disclosure may apply to video coding settings (e.g., video encoding or video decoding) that do not necessarily include any data communication between the encoding and decoding devices. In other examples, data is retrieved from a local memory, streamed over a network, or the like. A video encoding device may encode and store data to memory, and/or a video decoding device may retrieve and decode data from memory. In many examples, the encoding and decoding is performed by devices that do not communicate with one another, but simply encode data to memory and/or retrieve and decode data from memory.

In the example of FIG. 1, source device 12 includes a video source 18, a video encoder 20, and an output interface 22. In some examples, output interface 22 may include a modulator/demodulator (modem) and/or a transmitter. Video source 18 may include a video capture device, e.g., a video camera, a video archive containing previously-captured video data, a video feed interface to receive video data from a video content provider, and/or a computer graphics system for generating video data, or a combination of such sources of video data.

Video encoder 20 may encode video data from video source 18. In some examples, source device 12 directly transmits the encoded video data to destination device 14 via output interface 22. In other examples, the encoded video data may also be stored onto a storage medium or a file server for later access by destination device 14 for decoding and/or playback.

In the example of FIG. 1, destination device 14 includes an input interface 28, a video decoder 30, and a display device 32. In some examples, input interface 28 includes a receiver and/or a modem. Input interface 28 may receive encoded video data over channel 16. Display device 32 may be integrated with or may be external to destination device 14. In general, display device 32 displays decoded video data. Display device 32 may comprise a variety of display devices, such as a liquid crystal display (LCD), a plasma display, an organic light emitting diode (OLED) display, or another type of display device.

Video encoder 20 and video decoder 30 each may be implemented as any of a variety of suitable circuitry, such as one or more microprocessors, digital signal processors (DSPs), application-specific integrated circuits (ASICs), field-programmable gate arrays (FPGAs), discrete logic, hardware, or any combinations thereof. If the techniques are implemented partially in software, a device may store instructions for the software in a suitable, non-transitory computer-readable storage medium and may execute the instructions in hardware using one or more processors to perform the techniques of this disclosure. Any of the foregoing (including hardware, software, a combination of hardware and software, etc.) may be considered to be one or more processors. Each of video encoder 20 and video decoder 30 may be included in one or more encoders or decoders, either of which may be integrated as part of a combined encoder/decoder (CODEC) in a respective device.

This disclosure may generally refer to video encoder 20 "signaling" or "transmitting" certain information to another device, such as video decoder 30. The term "signaling" or "transmitting" may generally refer to the communication of syntax elements and/or other data used to decode the compressed video data. Such communication may occur in real- or near-real-time. Alternately, such communication may occur over a span of time, such as might occur when storing syntax elements to a computer-readable storage medium in an encoded bitstream at the time of encoding, which then may be retrieved by a decoding device at any time after being stored to this medium.

The techniques described in this disclosure may be usable with various video coding standards, including video coding techniques that are not related to a specific video coding standard. Examples of the video coding standards include ITU-T H.261, ISO/IEC MPEG-1 Visual, ITU-T H.262 or ISO/IEC MPEG-2 Visual, ITU-T H.263, ISO/IEC MPEG-4 Visual and ITU-T H.264 (also known as ISO/IEC MPEG-4 AVC), including its Scalable Video Coding (SVC) and Multiview Video Coding (MVC) extensions. In some examples, video encoder 20 and video decoder 30 operate according to a video compression standard, such as the HEVC standard mentioned above. In addition to the base HEVC standard, there are ongoing efforts to produce scalable video coding, multi-view video coding, and 3D coding extensions for HEVC. Recently, the design of a new video coding standard, named High-Efficiency Video Coding (HEVC), a multi-view extension to HEVC, named MV-HEVC, and a scalable extension to HEVC, named SHVC, have been finalized by the Joint Collaboration Team on Video Coding (JCT-VC) of ITU-T Video Coding Experts Group (VCEG) and ISO/IEC Motion Picture Experts Group (MPEG). The HEVC standard may also be referred to as Rec. ITU-T H.265|ISO/IEC 23008-2.

A HEVC draft specification entitled "Draft high efficiency video coding (HEVC) version 2, combined format range extensions (RExt), scalability (SHVC), and multi-view (MV-HEVC) extensions" for JCT-VC of ITU-T SG 16 WP 3 and ISO/IEC JTC 1/SC 29/WG 11 18th Meeting: Sapporo, JP, 30 Jun.-9 Jul. 2014 (JCTVC-R1013_v6), (referred to hereinafter as "JCTVC-R1013" or "Rec. ITU-T H.265|ISO/IEC 23008-2") is available from http://phenix.int-evry.fr/jct/doc_end_user/documents/18_Sapporo/wg11/JCTVC-R1013-v6.zip. MV-HEVC is incorporated as Annex G of Rec. ITU-T H.265|ISO/IEC 23008-2. SHVC is incorporated as Annex H of Rec. ITU-T H.265|ISO/IEC 23008-2.

An MV-HEVC draft specification entitled "MV-HEVC Draft Text 9" for Joint Collaborative Team on 3D Video Coding Extensions of ITU-T SG 16 WP 3 and ISO/IEC JTC 1/SC 29/WG 11 9th Meeting: Sapporo, JP, 3-9 Jul. 2014 (JCT3V-I1002-v7), which may be referred to as "MV-HEVC Draft Text 9", is available from http://phenix.int-evry.fr/jct3v/doc_end_user/documents/9_Sapporo/wg11/JCT3V-I1002-v7.zip.

The SHVC draft specification entitled "High efficiency video coding (HEVC) scalable extension Draft 7" for JCT-VC of ITU-T SG 16 WP 3 and ISO/IEC JTC 1/SC 29/WG 11 18th Meeting: Sapporo, JP, 30 Jun.-9 Jul. 2014 (JCTVC-R1008v7), which may be referred to as "SHVC Draft Text 7", is available from http://phenix.int-evry.fr/jct/doc_en-d_user/documents/18_Sapporo/wg11/CTVC-R1008-v7.zip.

In HEVC and other video coding standards, a video sequence typically includes a series of pictures. Pictures may also be referred to as "frames." A picture may include one or more sample arrays. For instance, a picture may include three sample arrays, denoted $S_L$, $S_{Cb}$ and $S_{Cr}$. $S_L$ is a two-dimensional array (i.e., a block) of luma samples. $S_{Cb}$ is a two-dimensional array of Cb chrominance samples. $S_{Cr}$ is a two-dimensional array of Cr chrominance samples. Chrominance samples may also be referred to herein as "chroma" samples. In other instances, a picture may be monochrome and may only include an array of luma samples.

To generate an encoded representation of a picture, video encoder 20 may generate a set of coding tree units (CTUs). Each of the CTUs may be a coding tree block of luma samples, two corresponding coding tree blocks of chroma samples, and syntax structures used to code the samples of the coding tree blocks. A coding tree block may be an N×N block of samples. A CTU may also be referred to as a "tree block" or a "largest coding unit" (LCU). The CTUs of HEVC may be broadly analogous to the macroblocks of other standards, such as H.264/AVC. However, a CTU is not necessarily limited to a particular size and may include one or more coding units (CUs). A slice may include an integer number of CTUs ordered consecutively in a scanning order, such as a raster scanning order.

To generate a coded CTU, video encoder 20 may recursively perform quad-tree partitioning on the coding tree blocks of a CTU to divide the coding tree blocks into coding blocks, hence the name "coding tree units." A coding block is an N×N block of samples. A CU may be a coding block of luma samples and two corresponding coding blocks of chroma samples of a picture that has a luma sample array, a Cb sample array and a Cr sample array, and syntax structures used to code the samples of the coding blocks. In monochrome pictures or pictures having three separate color planes, a CU may comprise a single coding block and syntax structures used to code the samples of the coding block.

Video encoder 20 may partition a coding block of a CU into one or more prediction blocks. A prediction block may be a rectangular (i.e., square or non-square) block of samples on which the same prediction is applied. A prediction unit (PU) of a CU may be a prediction block of luma samples, two corresponding prediction blocks of chroma samples of a picture, and syntax structures used to predict the prediction block samples. Video encoder 20 may generate predictive luma, Cb and Cr blocks for luma, Cb and Cr prediction blocks of each PU of the CU. In monochrome pictures or pictures having three separate color planes, a PU may comprise a single prediction block and syntax structures used to predict the prediction block.

Video encoder 20 may use intra prediction or inter prediction to generate the predictive blocks for a PU. If video encoder 20 uses intra prediction to generate the predictive blocks of a PU, video encoder 20 may generate the predictive blocks of the PU based on decoded samples of the picture associated with the PU.

If video encoder 20 uses inter prediction to generate the predictive blocks of a PU, video encoder 20 may generate the predictive blocks of the PU based on decoded samples of one or more pictures other than the picture associated with the PU. Video encoder 20 may use uni-prediction or bi-prediction to generate the predictive blocks of a PU. When video encoder 20 uses uni-prediction to generate the predictive blocks for a PU, the PU may have a single motion vector (MV). When video encoder 20 uses bi-prediction to generate the predictive blocks for a PU, the PU may have two MVs.

After video encoder 20 generates predictive blocks (e.g., predictive luma, Cb and Cr blocks) for one or more PUs of a CU, video encoder 20 may generate a residual block of the CU. Each sample in a residual block of the CU indicates a difference between a sample in a predictive block for a PU of the CU and a corresponding sample in a coding block of the CU. For example, video encoder 20 may generate a luma residual block of the CU. Each sample in the luma residual block of the CU indicates a difference between a luma sample in a predictive luma block of a PU of the CU and a corresponding sample in the luma coding block of the CU. In addition, video encoder 20 may generate a Cb residual block of the CU. Each sample in the Cb residual block of the CU may indicate a difference between a Cb sample in a predictive Cb block of a PU of the CU and a corresponding sample in the Cb coding block of the CU. Video encoder 20 may also generate a Cr residual block of the CU. Each sample in the Cr residual block of the CU may indicate a difference between a Cr sample in a predictive Cr block for a PU of the CU and a corresponding sample in the Cr coding block of the CU.

Furthermore, video encoder 20 may use quad-tree partitioning to decompose the residual blocks (e.g., luma, Cb and Cr residual blocks) of a CU into one or more transform blocks (e.g., luma, Cb and Cr transform blocks). A transform block may be a rectangular block of samples on which the same transform is applied. A transform unit (TU) of a CU may be a transform block of luma samples, two corresponding transform blocks of chroma samples, and syntax structures used to transform the transform block samples. Thus, each TU of a CU may be associated with a luma transform block, a Cb transform block, and a Cr transform block. The luma transform block associated with the TU may be a sub-block of the luma residual block of the CU. The Cb transform block may be a sub-block of the Cb residual block of the CU. The Cr transform block may be a sub-block of the Cr residual block of the CU. In monochrome pictures or pictures having three separate color planes, a TU may comprise a single transform block and syntax structures used to transform the samples of the transform block.

Video encoder 20 may apply one or more transforms to a transform block for a TU to generate a coefficient block for the TU. For example, video encoder 20 may apply one or more transforms to a luma transform block for a TU to generate a luma coefficient block for the TU. Video encoder 20 may apply one or more transforms to a Cb transform block of a TU to generate a Cb coefficient block for the TU. Video encoder 20 may apply one or more transforms to a Cr transform block of a TU to generate a Cr coefficient block for the TU. A coefficient block may be a two-dimensional array of transform coefficients. A transform coefficient may be a scalar quantity.

After generating a coefficient block (e.g., a luma coefficient block, a Cb coefficient block or a Cr coefficient block), video encoder 20 may quantize the coefficient block. Quantization generally refers to a process in which transform coefficients are quantized to possibly reduce the amount of data used to represent the transform coefficients, providing further compression. After video encoder 20 quantizes a coefficient block, video encoder 20 may entropy encode syntax elements indicating the quantized transform coefficients. For example, video encoder 20 may perform Context-Adaptive Binary Arithmetic Coding (CABAC) on the syntax elements indicating the quantized transform coefficients. Video encoder 20 may output the entropy-encoded syntax elements in a bitstream.

Video encoder 20 may output a bitstream that includes the entropy-encoded syntax elements. The bitstream may include a sequence of bits that forms a representation of coded pictures and associated data. The bitstream may comprise a sequence of network abstraction layer (NAL) units. Each of the NAL units includes a NAL unit header and encapsulates a raw byte sequence payload (RBSP). The NAL unit header may include a syntax element that indicates a NAL unit type code. The NAL unit type code specified by the NAL unit header of a NAL unit indicates the type of the NAL unit. A RBSP may be a syntax structure containing an integer number of bytes that is encapsulated within a NAL unit. In some instances, an RBSP includes zero bits.

Different types of NAL units may encapsulate different types of RBSPs. For example, different types of NAL unit may encapsulate different RBSPs for video parameter sets (VPSs), sequence parameter sets (SPSs), picture parameter sets (PPSs), coded slices, supplemental enhancement information (SEI), and so on. For instance, a first type of NAL unit may encapsulate an RBSP for a PPS, a second type of NAL unit may encapsulate an RBSP for a coded slice, a third type of NAL unit may encapsulate an RBSP for Supplemental Enhancement Information (SEI), and so on. NAL units that encapsulate RBSPs for video coding data (as opposed to RBSPs for parameter sets and SEI messages) may be referred to as video coding layer (VCL) NAL units. For instance, JCTVC-R1013 defines the term VCL NAL unit is a collective term for coded slice segment NAL units and the subset of NAL units that have reserved values of nal_unit_type that are classified as VCL NAL units in JCTVC-R1013. SEI contains information that is not necessary to decode the samples of coded pictures from VCL NAL units.

In the example of FIG. 1, video decoder 30 receives a bitstream generated by video encoder 20. In addition, video decoder 30 may parse the bitstream to obtain syntax elements from the bitstream. Video decoder 30 may reconstruct the pictures of the video data based at least in part on the syntax elements obtained from the bitstream. The process to reconstruct the video data may be generally reciprocal to the process performed by video encoder 20. For instance, video decoder 30 may use intra prediction or inter prediction to determine predictive blocks of the PUs of a current CU. In addition, video decoder 30 may inverse quantize coefficient blocks for TUs of the current CU. Video decoder 30 may perform inverse transforms on the coefficient blocks to reconstruct transform blocks for the TUs of the current CU. Video decoder 30 may reconstruct the coding blocks of the current CU by adding the samples of the predictive blocks for PUs of the current CU to corresponding samples of the transform blocks for the TUs of the current CU. By reconstructing the coding blocks for each CU of a picture, video decoder 30 may reconstruct the picture.

As briefly indicated above, NAL units may encapsulate RBSPs for video parameter sets (VPSs), sequence parameter sets (SPSs), picture parameter sets (PPSs). A VPS is a syntax structure comprising syntax elements that apply to zero or more entire coded video sequences (CVSs). An SPS is also a syntax structure comprising syntax elements that apply to zero or more entire CVSs. An SPS may include a syntax element that identifies a VPS that is active when the SPS is active. Thus, the syntax elements of a VPS may be more generally applicable than the syntax elements of an SPS. A PPS is a syntax structure comprising syntax elements that apply to zero or more coded pictures. A PPS may include a syntax element that identifies an SPS that is active when the PPS is active. A slice header of a slice may include a syntax element that indicates a PPS that is active when the slice is being coded.

In multi-view coding, there may be multiple views of the same scene from different viewpoints. In the context of multi-view coding, the term "access unit" may be used to refer to the set of pictures that correspond to the same time instance. Thus, video data may be conceptualized as a series of access units occurring over time. A "view component" may be a coded representation of a view in a single access unit. In this disclosure, a "view" may refer to a sequence of view components associated with the same view identifier. In some examples, a view component may be a texture view component (i.e., a texture picture) or a depth view component (i.e., a depth picture).

In MV-HEVC and SHVC, a video encoder may generate a bitstream that comprises a series of NAL units. Different NAL units of the bitstream may be associated with different layers of the bitstream. A layer may be defined as a set of VCL NAL units and associated non-VCL NAL units that have the same layer identifier. A layer may be equivalent to a view in multi-view video coding. In multi-view video coding, a layer can contain all view components of the same layer with different time instances. Each view component may be a coded picture of the video scene belonging to a specific view at a specific time instance. In some examples of multi-view or 3-dimensional video coding, a layer may contain either all coded depth pictures of a specific view or coded texture pictures of a specific view. In other examples of 3D video coding, a layer may contain both texture view components and depth view components of a specific view. Similarly, in the context of scalable video coding, a layer typically corresponds to coded pictures having video characteristics different from coded pictures in other layers. Such video characteristics typically include spatial resolution and quality level (e.g., Signal-to-Noise Ratio). In HEVC and its extensions, temporal scalability may be achieved within one layer by defining a group of pictures with a particular temporal level as a sub-layer.

For each respective layer of the bitstream, data in a lower layer may be decoded without reference to data in any higher layer. In scalable video coding, for example, data in a base layer may be decoded without reference to data in an enhancement layer. In general, NAL units may only encapsulate data of a single layer. Thus, NAL units encapsulating data of the highest remaining layer of the bitstream may be removed from the bitstream without affecting the decodability of data in the remaining layers of the bitstream. In multi-view coding, higher layers may include additional view components. In SHVC, higher layers may include signal to noise ratio (SNR) enhancement data, spatial enhancement data, and/or temporal enhancement data. In MV-HEVC and SHVC, a layer may be referred to as a "base layer" if a video decoder can decode pictures in the layer without reference to data of any other layer. The base layer may conform to the HEVC base specification (e.g., Rec. ITU-T H.265|ISO/IEC 23008-2).

In scalable video coding, layers other than the base layer may be referred to as "enhancement layers" and may provide information that enhances the visual quality of video data decoded from the bitstream. Scalable video coding can enhance spatial resolution, signal-to-noise ratio (i.e., quality) or temporal rate. In scalable video coding (e.g., SHVC), a "layer representation" may be a coded representation of a spatial layer in a single access unit. For ease of explanation, this disclosure may refer to view components and/or layer representations as "view components/layer representations" or simply "pictures."

Multi-view coding supports inter-view prediction. Inter-view prediction is similar to the inter prediction used in HEVC and may use the same syntax elements. However, when a video coder performs inter-view prediction on a current video unit (such as a PU), video encoder 20 may use, as a reference picture, a picture that is in the same access unit as the current video unit, but in a different view. In contrast, conventional inter prediction only uses pictures in different access units as reference pictures.

In multi-view coding, a view may be referred to as a "base view" if a video decoder (e.g., video decoder 30) can decode pictures in the view without reference to pictures in any other view. When coding a picture in one of the non-base views, a video coder (such as video encoder 20 or video decoder 30) may add a picture into a reference picture list if the picture is in a different view but within a same time instance (i.e., access unit) as the picture that the video coder is currently coding. Like other inter prediction reference pictures, the video coder may insert an inter-view prediction reference picture at any position of a reference picture list.

For instance, NAL units may include headers (i.e., NAL unit headers) and payloads (e.g., RBSPs). The NAL unit headers may include nuh_reserved_zero_6bits syntax elements, which may also be referred to as nuh_layer_id syntax elements. NAL units that have nuh_layer_id syntax elements that specify different values belong to different "layers" of a bitstream. Thus, in multi-view coding, MV-HEVC, SVC, or SHVC, the nuh_layer_id syntax element of the NAL unit specifies a layer identifier (i.e., a layer ID) of the NAL unit. The nuh_layer_id syntax element of a NAL unit is equal to 0 if the NAL unit relates to a base layer in multi-view coding, MV-HEVC or SHVC. Data in a base layer of a bitstream may be decoded without reference to data in any other layer of the bitstream. If the NAL unit does not relate to a base layer in multi-view coding, MV-HEVC or SHVC, the nuh_layer_id syntax element may have a non-zero value. In multi-view coding, different layers of a bitstream may correspond to different views. In SVC or SHVC, layers other than the base layer may be referred to as "enhancement layers" and may provide information that enhances the visual quality of video data decoded from the bitstream.

Furthermore, some pictures within a layer may be decoded without reference to other pictures within the same layer. Thus, NAL units encapsulating data of certain pictures of a layer may be removed from the bitstream without affecting the decodability of other pictures in the layer. Removing NAL units encapsulating data of such pictures may reduce the frame rate of the bitstream. A subset of pictures within a layer that may be decoded without reference to other pictures within the layer may be referred to herein as a "sub-layer" or a "temporal sub-layer."

NAL units may include temporal_id syntax elements. The temporal_id syntax element of a NAL unit specifies a temporal identifier of the NAL unit. The temporal identifier of a NAL unit identifies a temporal sub-layer with which the NAL unit is associated. Thus, each temporal sub-layer of a bitstream may be associated with a different temporal identifier. If the temporal identifier of a first NAL unit is less than the temporal identifier of a second NAL unit, the data encapsulated by the first NAL unit may be decoded without reference to the data encapsulated by the second NAL unit.

A bitstream may be associated with a plurality of operation points. In some examples, each operation point of a bitstream may be associated with a set of layer identifiers (i.e., a set of nuh_reserved_zero_6bits values) and a temporal identifier. The set of layer identifiers may be denoted as OpLayerIdSet and the temporal identifier may be denoted as TemporalID. If a NAL unit's layer identifier is in an operation point's set of layer identifiers and the NAL unit's temporal identifier is less than or equal to the operation point's temporal identifier, the NAL unit is associated with the operation point. Thus, an operation point may be a bitstream created from another bitstream by operation of the sub-bitstream extraction process with another bitstream, a target highest TemporalId, and a target layer identifier list as inputs to the sub-bitstream extraction process. The operation point, which may also be referred to as an operation point representation, may include each NAL unit that is associated with the operation point. In some examples, the operation point does not include VCL NAL units that are not associated with the operation point.

Parameter sets, such VPSs, SPSs, and PPSs may include extension syntax structures specific to extensions to the HEVC standard. For example, parameter sets may include extensions specific to SHVC, MV-HEVC, and so on. The extension syntax structures may include syntax elements applicable to extensions to the HEVC standard. Table 1, below, shows a portion of VPS extension defined in SHVC Draft Text 7 and MV-HEVC Draft Text 9.

TABLE 1

| vps_extension( ) { | Descriptor |
|---|---|
| avc_base_layer_flag | u(1) |
| ... | u(1) |
| if( NumLayerSets > 1 ) { | |
|   num_add_olss | ue(v) |
|   default_output_layer_idc | u(2) |
| } | |
| NumOutputLayerSets = num_add_olss + NumLayerSets | |

TABLE 1-continued

```
for( i = 1; i < NumOutputLayerSets; i++ ) {
  if( NumLayerSets > 2 && i >= NumLayerSets )
    layer_set_idx_for_ols_minus1[ i ]                                            u(v)
  if( i > vps_num_layer_sets_minus1 || defaultOutputLayerIdc = = 2 )
    for( j = 0; j < NumLayersInIdList[ OlsIdxToLsIdx[ i ] ]; j++ )
      output_layer_flag[ i ][ j ]                                                u(1)
  for( j = 0; j < NumLayersInIdList[ OlsIdxToLsIdx[ i ] ]; j++ )
    if( NecessaryLayerFlag[ i ][ j ] && vps_num_profile_tier_level_minus1
> 0 )
      profile_tier_level_idx[ i ][ j ]                                           u(v)
  if( NumOutputLayersInOutputLayerSet[ i ] = = 1
      && NumDirectRefLayers[ OlsHighestOutputLayerId[ i ] ] > 0 )
    alt_output_layer_flag[ i ]                                                   u(1)
}
```

In the example of Table 1, above, and other syntax tables of this disclosure, syntax elements with type descriptor ue(v) may be variable-length unsigned integers encoded using $0^{th}$ order exponential Golomb (Exp-Golomb) coding with left bit first. In the example of Table 1 and the following tables, syntax elements having descriptors of the form u(n), where n is a non-negative integer, are unsigned values of length n.

The portion of the VPS extension defined in Table 1 includes syntax elements defining one or more output layer sets (OLSs). An output layer set is a set of layers consisting of the layers of one of the layer sets specified in the VPS, where one or more layers in the set of layers are indicated to be output layers. Particularly, the layer_set_idx_for_ols_minus1[i] syntax element, plus 1, specifies an index of the i-th output layer set. The output_layer_flag[i][j] syntax element equal to 1 specifies that the j-th layer in the i-th OLS is an output layer. The output_layer_flag[i][j] syntax element equal to 0 specifies that the j-th layer in the i-th OLS is not an output layer.

An output layer set may have one or more partitioning schemes. A partitioning scheme of an output layer set divides layers in the output layer set into one or more partitions. Each layer in an output layer set belongs to exactly one partition in a partitioning scheme.

At least some video coding standards specify video buffering models. In H.264/AVC and HEVC, a buffering model is referred to as a "hypothetical reference decoder" or "HRD." In the HEVC draft specification, the HRD is described in Annex C. The HRD describes how data is to be buffered for decoding and how decoded data is buffered for output. For instance, the HRD describes the operation of a coded picture buffer ("CPB"), a decoded picture buffer ("DPB"), and a video decoding process. The CPB is a first-in first-out buffer containing access units in a decoding order specified by HRD. The DPB is a buffer holding decoded pictures for reference, output reordering, or output delay specified by the HRD. The behaviors of the CPB and DPB may be mathematically specified. The HRD may directly impose constraints on timing, buffer sizes, and bit rates. Furthermore, the HRD may indirectly impose constraints on various bitstream characteristics and statistics.

In H.264/AVC and HEVC, bitstream conformance and decoder conformance are specified as parts of the HRD specification. In other words, the HRD model specifies tests to determine whether a bitstream conforms to a standard and tests to determine whether a decoder conforms to the standard. Though the HRD is named as some kind of decoder, video encoders typically use the HRD to guarantee bitstream conformance, while video decoders typically do not need the HRD.

H.264/AVC and HEVC both specify two types of bitstream or HRD conformance, namely Type I and Type II. A Type I bitstream is a NAL unit stream containing only the VCL NAL units and filler data NAL unit for all access units in the bitstream. In at least some examples, a NAL unit stream is a sequence of NAL units. A Type II bitstream is a NAL unit stream that contains, in addition to the VCL NAL units and filler data NAL units for all access units in the bitstream, at least one of the following: additional non-VCL NAL units other than filler data NAL units; and all leading_zero_8bits, zero_byte, start_coded_prefix_one_3 bytes, and trailing_zero_8bits syntax elements that form a byte stream from the NAL unit stream.

When a device performs a bitstream conformance test that determines whether a bitstream conforms to a video coding standard, the device may select an operation point of the bitstream. The device may then determine a set of HRD parameters applicable to the selected operation point. The device may use the set of HRD parameters applicable to the selected operation point to configure the behavior of the HRD. More particularly, the device may use the applicable set of HRD parameters to configure the behaviors of particular components of the HRD, such as a hypothetical stream scheduler (HSS), the CPB, a decoding process, the DPB, and so on. Subsequently, the HSS may inject coded video data of the bitstream into the CPB of the HRD according to a particular schedule. Furthermore, the device may invoke a decoding process that decodes the coded video data in the CPB. The decoding process may output decoded pictures to the DPB. As the device moves data through the HRD, the device may determine whether a particular set of constraints remains satisfied. For example, the device may determine whether an overflow or underflow condition occurs in the CPB or DPB while the HRD is decoding the selected operation point. The device may select and process each operation point of the bitstream in this manner. If no operation point of the bitstream causes the constraints to be violated, the device may determine that the bitstream conforms to the video coding standard.

Both H.264/AVC and HEVC specify two types of decoder conformance, namely output timing decoder conformance and output order decoder conformance. A decoder claiming conformance to a specific profile, tier and level is able to successfully decode all bitstreams that conform to the bitstream conformance requirements of a video coding standard, such as HEVC.

When a device performs a decoder conformance test to determine whether a decoder under test (DUT) conforms to a video coding standard, the device may provide, to both the HRD and the DUT, a bitstream that conforms to the video coding standard. The HRD may process the bitstream in the manner described above with regard to the bitstream conformance test. The device may determine that the DUT conforms to the video coding standard if the order of decoded pictures output by the DUT matches the order of decoded pictures output by the HRD. Moreover, the device may determine that the DUT conforms to the video coding standard if the timing with which the DUT outputs decoded pictures matches the timing with which the HRD outputs the decoded pictures.

In the H.264/AVC and HEVC HRD models, decoding or CPB removal may be access unit (AU) based. That is, the HRD is assumed to decode complete access units at one time and remove complete access units from the CPB. Furthermore, in the H.264/AVC and HEVC HRD models, it is assumed that picture decoding is instantaneous. Video encoder 20 may signal, in picture timing SEI messages, decoding times to start decoding of access units. In practical applications, if a conforming video decoder strictly follows the decoding times signaled to start decoding of access units, the earliest possible time to output a particular decoded picture is equal to the decoding time of that particular picture plus the time needed for decoding that particular picture. However, in the real world, the time needed for decoding a picture cannot be equal to zero.

HRD parameters may control various aspects of the HRD. In other words, the HRD may rely on the HRD parameters. The HRD parameters may include an initial CPB removal delay, a CPB size, a bit rate, an initial DPB output delay, and a DPB size. Video encoder 20 may signal these HRD parameters in a hrd_parameters( ) syntax structure specified in a VPS and/or a SPS. Individual VPSs and/or SPSs may include multiple hrd_parameters( ) syntax structures for different sets of HRD parameters. In some examples, video encoder 20 may signal HRD parameters in buffering period SEI messages or picture timing SEI messages. Table 2, below, is an example syntax for a hrd_parameters( ) syntax structure in HEVC.

TABLE 2

| HRD Parameters | |
| --- | --- |
| hrd_parameters( commonInfPresentFlag, MaxNumSubLayersMinus1 ) { | Descriptor |
|   if( commonInfPresentFlag ) { | |
|     timing_info_present_flag | u(1) |
|     if( timing_info_present_flag ) { | |

TABLE 2-continued

| HRD Parameters | |
| --- | --- |
|       num_units_in_tick | u(32) |
|       time_scale | u(32) |
|     } | |
|     nal_hrd_parameters_present_flag | u(1) |
|     vcl_hrd_parameters_present_flag | u(1) |
|     if( nal_hrd_parameters_present flag \|\| vcl_hrd_parameters_present_flag ){ | |
|       sub_pic_cpb_params_present_flag | u(1) |
|       if( sub_pic_cpb_params_present_flag ){ | |
|         tick_divisor_minus2 | u(8) |
|         du_cpb_removal_delay_length_minus1 | u(5) |
|       } | |
|       bit_rate_scale | u(4) |
|       cpb_size_scale | u(4) |
|       initial_cpb_removal_delay_length_minus1 | u(5) |
|       cpb_removal_delay_length_minus1 | u(5) |
|       dpb_output_delay_length_minus1 | u(5) |
|     } | |
| } | |
| for( i = 0; i <= MaxNumSubLayersMinus1; i++ ){ | |
|   fixed_pic_rate_flag[ i ] | u(1) |
|   if( fixed_pic_rate_flag[ i ] ) | |
|     pic_duration_in_tc_minus1[ i ] | ue(v) |
|   low_delay_hrd_flag[ i ] | u(1) |
|   cpb_cnt_minus1[ i ] | ue(v) |
|   if( nal_hrd_parameters_present_flag ) | |
|     sub_layer_hrd_parameters( i ) | |
|   if( vcl_hrd_parameters_present_flag ) | |
|     sub_layer_hrd_parameters( i ) | |
| } | |
| } | |

In Table 2, cpb_cnt_minus1[i] plus 1 specifies the number of alternative CPB specifications in the bitstream of the CVS when HighestTid is equal to i. The value of cpb_cnt_minus1[i] is in the range of 0 to 31, inclusive. When not present, the value of cpb_cnt_minus1[i] is inferred to be equal to 0.

Furthermore, a VPS may include a video usability information (VUI) syntax structure. In Rec. ITU-T H.265|ISO/IEC 23008-2, the VUI syntax structure in a VPS is denoted vps_vui( ). The VPS VUI syntax structure includes a VUI bitstream HRD parameters syntax structure. In Rec. ITU-T H.265|ISO/IEC 23008-2, the VUI bitstream HRD parameters syntax structure in a VPS is denoted vps_vui_bsp_jhrd_params( ). Table 3, below, is a syntax table for the vps_vui_bsp_hrd_params( ) syntax structure in Rec. ITU-T H.265|ISO/IEC 23008-2.

TABLE 3

| VPS VUI BSP HRD Parameters Syntax Structure | |
| --- | --- |
| vps_vui_bsp_hrd_params( ) { | |
|   vps_num_add_hrd_params | ue(v) |
|   for( i = vps_num_hrd_parameters; i < vps_num_hrd_parameters + vps_num_add_hrd_params; i++ ) { | |
|     if( i > 0 ) | |
|       cprms_add_present_flag[ i ] | u(1) |
|     num_sub_layer_hrd_minus1[ i ] | ue(v) |
|     hrd_parameters( cprms_add_present_flag[ i ], num_sub_layer_hrd_minus1[ i ] ) | |
|   } | |
|   if( vps_num_hrd_parameters + vps_num_add_hrd_params > 0 ) | |
|     for( h = 1; h < NumOutputLayerSets; h++ ) { | |
|       num_signaled_partitioning_schemes[ h ] | ue(v) |
|       for( j = 1; j < num_signaled_partitioning_schemes[ h ] + 1; j++ ) { | |
|         num_partitions_in_scheme_minus1[ h ][ j ] | ue(v) |
|         for( k = 0; k <= num_partitions_in_scheme_minus1[ h ][ j ]; k++ ) | |
|           for( r = 0; r < NumLayersInIdList[ OlsIdxToLsIdx[ h ] ]; r++ ) | |
|             layer_included_in_partition_flag[ h ][ j ][ k ][ r ] | u(1) |
|       } | |

TABLE 3-continued

VPS VUI BSP HRD Parameters Syntax Structure

```
    for( i = 0; i < num_signaled_partitioning_schemes[ h ] + 1; i++ )
        for( t = 0; t <= MaxSubLayersInLayerSetMinus1[ OlsIdxToLsIdx[
h ] ]; t++ ) {
        num_bsp_schedules_minus1[ h ][ i ][ t ]                           ue(v)
        for( j = 0; j <= num_bsp_schedules_minus1[ h ][ i ][ t ]; j++ )
            for( k = 0; k <= num_partitions_in_scheme_minus1[ h ][ i ]; k++
) {
            if( vps_num_hrd_parameters + vps_num_add_hrd_params > 1 )
                bsp_hrd_idx[ h ][ i ][ t ][ j ][ k ]                       u(v)
            bsp_sched_idx[ h ][ i ][ t ][ j ][ k ]                         ue(v)
        }
    }
  }
}
```

In Table 3, above, bsp_hrd_idx[h][i][t][j][k] specifies the index of the hrd_parameters( ) syntax structure in the VPS for the j-th delivery schedule specified for the k-th bitstream partition of the i-th partitioning scheme for the h-th OLS when HighestTid is equal to t. As indicated above, a bitstream partition is a sequence of bits, in the form of a NAL unit stream or a byte stream, that is a subset of a bitstream according to a partitioning scheme that divides layers in an output layer set into one or more partitions. The length of the bsp_hrd_idx[h][i][t][j][k] syntax element is Ceil(Log2 (vps_num_hrd_parameters+vps_num_add_hrd_params)) bits. The value of bsp_hrd_idx[h][i][t][j][k] is in the range of 0 to vps_num_hrd_parameters+vps_num_add_hrd_params−1, inclusive. When vps_num_hrd_parameters+vps_num_add_hrd_params is equal to 1, the value of bsp_hrd_idx[h][i][t][j][k] is inferred to be equal to 0.

HEVC and other video coding standards specify profiles, tiers, and levels. Profiles, tiers, and levels specify restrictions on bitstreams and hence limits on the capabilities needed to decode the bitstreams. Profiles, tiers, and levels may also be used to indicate interoperability points between individual decoder implementations. Each profile specifies a subset of algorithmic features and limits that is supported by all video decoders conforming to that profile. Video encoders are not required to make use of all features supported in a profile.

Each level of a tier may specify a set of limits on the values that syntax elements and variables may have. The same set of tier and level definitions may be used with all profiles, but individual implementations may support a different tier and within a tier a different level for each supported profile. For any given profile, a level of a tier may generally correspond to a particular decoder processing load and memory capability. Capabilities of video decoders may be specified in terms of the ability to decode video streams conforming to the constraints of particular profiles, tiers, and levels. For each such profile, the tier, and level supported for that profile may also be expressed. Some video decoders may not be able to decode particular profiles, tiers, or levels.

In HEVC, profiles, tiers, and levels may be signaled by the syntax structure profile_tier_level( ) syntax structure. The profile_tier_level( ) syntax structure may be included in a VPS and/or a SPS. The profile_tier_level( ) syntax structure may include a general_profile_idc syntax element, a general_tier_flag syntax element, and a general_level_idc syntax element. The general_profile_idc syntax element may indicate a profile to which a CVS conforms. The general_tier_flag syntax element may indicate a tier context for interpretation of the general_level_idc syntax element.

The general_level_idc syntax element may indicate a level to which a CVS conforms. Other values for these syntax elements may be reserved.

Capabilities of video decoders may be specified in terms of the ability to decode video streams conforming to the constraints of profiles, tiers, and levels. For each such profile, the tier and level supported for that profile may also be expressed. In some examples, video decoders do not infer that a reserved value of the general_profile_idc syntax element between the values specified in HEVC indicates intermediate capabilities between the specified profiles. However, video decoders may infer that a reserved value of the general_level_idc syntax element associated with a particular value of the general_tier_flag syntax element between the values specified in HEVC indicates intermediate capabilities between the specified levels of the tier.

The MPEG-2 Systems specification describes how compressed multimedia (video and audio) data streams may be multiplexed together with other data to form a single data stream suitable for digital transmission or storage. The latest specification of MPEG-2 TS is the ITU-T recommendation H.222.0, 2012 June version (herein, "MPEG-2 TS"), wherein the support of advanced video coding (AVC) and AVC extensions are provided. Recently, the amendment of MPEG-2 TS for HEVC has been developed. The latest document is "Text of ISO/IEC 13818-1: 2013/Final Draft Amendment 3—Transport of HEVC video over MPEG-2 Systems," in MPEG output document N13656, July 2013 (hereinafter, "document N13656" or "HEVC TS specification").

The MPEG-2 Systems specification defines the concept of an elementary stream. Specifically, an elementary stream is a single, digitally coded (possibly MPEG-compressed) component of a program. For example, the coded video or audio part of the program can be an elementary stream. An elementary stream is firstly converted into a packetized elementary stream (PES) before being multiplexed into a program stream or transport stream. Within the same program, stream_id is used to distinguish the PES-packets belonging to one elementary stream from another.

Each respective elementary stream has a stream type identifier that identifies a stream type of the respective elementary stream. An elementary stream with a stream type equal to 0x24 is an HEVC video stream or an HEVC temporal video sub-bitstream or an HEVC base sub-partition. As defined in document N13656, an HEVC video stream is a byte stream as specified in Rec. ITU-T H. 265|ISO/IEC 23008-2 Annex B. An HEVC temporal video sub-bitstream is a bitstream comprising an HEVC temporal sub-layer with TemporalID equal to 0 and zero or more HEVC temporal sub-layers with TemporalID not equal to 0. As defined in document N13656, an HEVC base sub-partition is an HEVC video sub-bitstream that is also a conforming bitstream as specified in Rec. ITU-T H.265|ISO/IEC 23008-2, which contains all VCL NAL units and the associated non-VCL NAL units of one or more layers up to a target highest TemporalId identified by a target HEVC operation point of which the target layer identifier list includes the nuh_layer_id value equal to 0.

An elementary stream with a stream type equal to 0x27 is an HEVC enhancement sub-partition which includes TemporalId 0 of an HEVC video stream conforming to one or more profiles defined in Annex G of ITU-T Rec. H.265|ISO/IEC 23008-2. As defined in document N13656, an HEVC enhancement sub-partition is one or more HEVC layers, or an HEVC temporal video sub-bitstream or HEVC temporal video subset thereof, of which the HEVC layer aggregation with an HEVC base sub-partition and zero or more other HEVC sub-partitions, according to the layer list of the operation point of the highest layer and highest TemporalId included this video sub-bitstream, results in a valid HEVC layered video stream. An HEVC temporal video subset comprises one or more HEVC temporal sub-layers. An HEVC temporal video subset differs from an HEVC temporal video sub-bitstream in that an HEVC temporal video subset does not necessarily include an HEVC temporal sub-layer with TemporalID equal to 0.

As defined in document N13656, HEVC layer aggregation is successive HEVC layer component aggregation of all HEVC layer components in an HEVC video sequence. As defined in document N13656, HEVC layer components are VCL NAL units and the associated non-VCL NAL units of an HEVC access unit which belong to an HEVC sub-partition. Furthermore, as defined in document N13656, HEVC layer component aggregation is the concatenation of all HEVC layer components with the same output time from all HEVC sub-partitions indicated in an HEVC layer list in the order indicated by the HEVC layer list, resulting in a valid access unit as defined in Annex F of Rec. ITU-T H.265|ISO/IEC 23008-2.

As used in the context of MPEG-2 TS, the term "HEVC sub-partition" refers to either an HEVC base sub-partition or an HEVC enhancement sub-partition. The same concept may be referred to as a "partition" in the context of SHVC and MV-HEVC. As defined in the HEVC TS specification, the term "HEVC base sub-partition" is an HEVC video sub-bitstream that conforms to the HEVC standard and contains all VCL NAL units of one or more layers up to a target highest TemporalId identified by a target HEVC operation point of which the target layer identifier list includes the nuh_layer_id value equal to 0. Furthermore, as defined in the HEVC TS specification, the term "HEVC enhancement sub-partition" refers to one or more HEVC layers, or an HEVC temporal video sub-bitstream or HEVC temporal video subset thereof, of which the HEVC layer aggregation with an HEVC base sub-partition and zero or more other HEVC sub-partitions, according to the layer list of the operation point of the highest layer and highest TemporalId included this video sub-bitstream, results in a valid HEVC layered video stream.

An elementary stream with a stream type equal to 0x28 is an HEVC temporal enhancement sub-partition of an HEVC video stream conforming to one or more profiles defined in Annex G of ITU-T Rec. H.265|ISO/IEC 23008-2. As defined in document N13656, an HEVC temporal enhancement sub-partition is an HEVC temporal video subset of the same set of HEVC layers as another HEVC enhancement sub-partition of the same HEVC video stream which contains one or more complementary temporal sub-layers, as specified in Rec. ITU-T H.265|ISO/IEC 23008-2. In this disclosure, a complementary temporal sub-layer is a HEVC temporal enhancement sub-partition that provides temporal (frame-rate) enhancement to the main sub-partition. For example, assume a layer has two temporal sub-layers (Tid 0 and Tid 1). In this example, it is possible to transport the two temporal sub-layers in two elementary streams (or two sub-partition) in which the Tid 0 is in the main sub-partition and Tid 1 is in temporal enhancement sub-partition.

Furthermore, an elementary stream with a stream type equal to 0x29 is an HEVC enhancement sub-partition which includes TemporalId 0 of an HEVC video stream conforming to one or more profiles defined in Annex H of ITU-T Rec. H.265|ISO/IEC 23008-2. An elementary stream with a stream type equal to 0x2A is an HEVC temporal enhancement sub-partition of an HEVC video stream conforming to one or more profiles defined in Annex H of ITU-T Rec. H.265|ISO/IEC 23008-2.

As indicated briefly above, the MPEG-2 Systems specification defines the concepts of a program stream and a transport stream. Program streams and transport streams are two alternative multiplexes targeting different applications. Program streams are biased for the storage and display of a single program from a digital storage service and a program stream is intended for use in error-free environments because it is rather susceptible to errors. In contrast, transport streams are intended for the simultaneous delivery of a number of programs over potentially error-prone channels. In general, a transport stream is a multiplex devised for multi-program applications such as broadcasting, so that a single transport stream can accommodate many independent programs. A program stream simply comprises the elementary streams belonging to it and usually contains variable length packets.

In a program stream, PES-packets that are derived from the contributing elementary streams are organized into 'packs.' A pack comprises a pack-header, an optional system header, and any number of PES-packets taken from any of contributing elementary streams (i.e., elementary streams of the program stream), in any order. The system header contains a summary of the characteristics of the program stream such as: the maximum data rate of the program stream, the number of contributing video and audio elementary streams of the program stream, and further timing information. A decoder, such as decoder 30, may use the information contained in a system header to determine whether or not the decoder is capable of decoding the program stream.

A transport stream comprises a succession of transport packets. Transport packets are a type of PES-packets. Each of the transport packets is 188-bytes long. The use of short, fixed length packets in transport streams means that the transport streams are not as susceptible to errors as program streams. Further, processing the transport packet through a standard error protection process, such as Reed-Solomon encoding may give each 188-byte-long transport packet additional error protection. The improved error resilience of a transport stream means that the transport stream has a better chance of surviving error-prone channels, such as those found in a broadcast environment. Given the increased error resilience of transport streams and the ability to carry many simultaneous programs in a transport stream, it might seem that transport streams are clearly the better of the two multiplexes (i.e., program streams and transport streams). However, the transport stream is a more sophisticated multiplex than the program stream and is consequently more difficult to create and to demultiplex.

The first byte of a transport packet is a synchronization byte, which is 0x47. A single transport stream may carry many different programs, each comprising many packetised elementary streams. In addition, a transport packet includes a 13-bit Packet Identifier (PID) field. The PID field is used to distinguish transport packets containing the data of one elementary stream from transport packets carrying data of other elementary streams. It is the responsibility of the multiplexer to ensure that each elementary stream is awarded a unique PID value. The last byte of a transport packet is the continuity count field. The value of the continuity count field is incremented between successive transport packets belonging to the same elementary stream. Incrementing the value of the continuity count field enables a decoder, such as decoder 30, to detect the loss or gain of a transport packet and potentially conceal errors that might otherwise result from the loss or gain of a transport packet.

Although an elementary stream to which a transport packet belongs may be determined based on a PID value of the transport packet, a decoder may need to be able to determine which elementary streams belong to which program. Accordingly, program specific information explicitly specifies the relationship between programs and component elementary streams. For instance, the program specific information may specify a relationship between a program and elementary streams belonging to the program. The program specific information of a transport stream may include a program map table (PMT), a program association table (PAT), a conditional access table, and a network information table.

Every program carried in a transport stream is associated with a Program Map Table (PMT). A PMT is permitted to include more than one program. For instance, multiple programs carried in a transport stream may be associated with the same PMT. A PMT associated with a program gives details about the program and the elementary streams that comprise the program. For example, a program with number 3 may contain the video with PID 33, English audio with PID 57, Chinese audio with PID 60. In other words, in this example, the PMT may specify that an elementary stream whose transport packets include PID fields with values equal to 33 contains video of a program with a number (e.g., program_number) equal to 3, that an elementary stream whose transport packets include PID fields with values equal to 57 contains English audio of the program with number 3, and that an elementary stream whose transport packets include PID fields with values equal to 60 contains Chinese audio of the program with number 3.

A basic PMT may be embellished with some of the many descriptors specified within the MPEG-2 systems specification. In other words, a PMT may include one or more descriptors. The descriptors convey further information about a program or component elementary streams of the program. The descriptors may include video encoding parameters, audio encoding parameters, language identification information, pan-and-scan information, conditional access details, copyright information, and so on. A broadcaster or other user may define additional private descriptors, if required. In video related component elementary streams, there may also be a hierarchy descriptor. The hierarchy descriptor provides information identifying the program elements containing components of hierarchically-coded video, audio, and private streams. The private streams may include metadata, such as a stream of program specific information. In general, a program element is one of the data or elementary streams that are included in a program (i.e., a component elementary stream of the program). In MPEG-2 transport streams, program elements are usually packetized. In MPEG-2 program streams, the program elements are not packetized.

Program-specific information of a program stream may include a program stream map (PSM). A PSM of a program stream provides a description of elementary streams in the program stream and the relationships of the elementary streams to one another. When carried in a Transport Stream this structure shall not be modified. The PSM is present as a PES packet when the stream_id value is 0xBC.

As indicated above, the program-specific information of a transport stream may include a program association table (PAT). The PAT of a transport stream contains a complete list of all the programs available in the transport stream. The PAT always has the PID value 0. In other words, transport packets having PID values equal to 0 contain the PAT. The PAT lists each respective program of a transport stream along with the PID value of the transport packets that contain the Program Map Table associated with the respective program. For instance, in the example PMT described above, the PAT may include information specifying that the PMT that specifies the elementary streams of program number 3 has a PID of 1001 and may include information specifying that another PMT has another PID of 1002. In other words, in this example, the PAT may specify that transport packets whose PID fields have values equal to 1001 contain the PMT of program number 3 and the PAT may specify that transport packets whose PID fields have values equal to 1002 contain the PMT of another program.

Furthermore, as indicated above, the program-specific information of a transport stream may include a network information table (NIT). The program number zero, specified in a PAT of a transport stream, has special meaning. Specifically, program number 0 points to the NIT. The NIT of a transport stream is optional and when present, the NIT provides information about the physical network carrying the transport stream. For instance the NIT may provide information such as channel frequencies, satellite transponder details, modulation characteristics, service originator, service name and details of alternative networks available.

As indicated above, the program-specific information of a transport stream may include a conditional access table (CAT). In some examples, a CAT must be present if any elementary stream within a transport stream is scrambled. The CAT provides details of the scrambling system(s) in use and provides the PID values of transport packets that contain the conditional access management and entitlement information. MPEG-2 does not specify the format of this information.

As indicated above, a PMT may include one or more descriptors that convey information about a program or component elementary stream of a program. The one or more descriptors in a PMT may include a hierarchy descriptor. In MPEG-2 transport stream (TS), the hierarchy descriptor is designed to signal the hierarchy of the sub-bitstreams in different elementary streams. The hierarchy descriptor provides information to identify the program elements containing components of hierarchically-coded video, audio, and private streams, such as layers in L-HEVC. Table 2-49, below, shows a syntax of a hierarchy descriptor. The paragraphs following Table 2-49 describe semantics of the fields of the hierarchy descriptor.

TABLE 2-49

Hierarchy descriptor

| Syntax | No. of bits | Mnemonic |
|---|---|---|
| hierarchy_descriptor( ) { | | |
|   descriptor_tag | 8 | uimsbf |
|   descriptor_length | 8 | uimsbf |
|   reserved | 1 | bslbf |
|   temporal_scalability_flag | 1 | bslbf |
|   spatial_scalability_flag | 1 | bslbf |
|   quality_scalability_flag | 1 | bslbf |
|   hierarchy_type | 4 | uimsbf |
|   reserved | 2 | bslbf |
|   hierarchy_layer_index | 6 | uimsbf |
|   tref_present_flag | 1 | bslbf |
|   reserved | 1 | bslbf |
|   hierarchy_embedded_layer_index | 6 | uimsbf |
|   reserved | 2 | bslbf |
|   hierarchy_channel | 6 | uimsbf |
| } | | | temporal_scalability_flag—A 1-bit flag, which when set to '0' indicates that the associated program element enhances the frame rate of the bit-stream resulting from the program element referenced by the hierarchy_embedded_layer_index. The value of '1' for this flag is reserved.

spatial_scalability_flag—A 1-bit flag, which when set to '0' indicates that the associated program element enhances the spatial resolution of the bit-stream resulting from the program element referenced by the hierarchy_embedded_layer_index. The value of '1' for this flag is reserved.

quality_scalability_flag—A 1-bit flag, which when set to '0' indicates that the associated program element enhances the SNR quality or fidelity of the bit-stream resulting from the program element referenced by the hierarchy_embedded_layer_index. The value of '1' for this flag is reserved.

hierarchy_type—The hierarchical relation between the associated hierarchy layer and its hierarchy-embedded layer is defined in Table 2-50 (shown below). If scalability applies in more than one dimension, this field shall be set to the value of '8' ("Combined Scalability"), and the flags temporal_scalability_flag, spatial_scalability_flag and quality_scalability_flag shall be set accordingly. For MVC video sub-bitstreams, this field shall be set to the value of '9' ("MVC video sub-bitstream") and the flags temporal_scalability_flag, spatial_scalability_flag and quality_scalability_flag shall be set to '1'. For MVC base view sub-bitstreams, the hierarchy_type field shall be set to the value of '15' and the flags temporal_scalability_flag, spatial_scalability_flag and quality_scalability_flag shall be set to '1'.

hierarchy_layer_index—The hierarchy_layer_index is a 6-bit field that defines a unique index of the associated program element in a table of coding layer hierarchies. Indices shall be unique within a single program definition. For video sub-bitstreams of AVC video streams conforming to one or more profiles defined in Annex G of Rec. ITU-T H.264|ISO/IEC 14496-10, this is the program element index, which is assigned in a way that the bitstream order will be correct if associated scalable video coding dependency representations of the video sub-bitstreams of the same access unit are re-assembled in increasing order of hierarchy_layer_index. For MVC video sub-bitstreams of AVC video streams conforming to one or more profiles defined in Annex H of Rec. ITU-T H.264|ISO/IEC 14496-10, this is the program element index, which is assigned in a way that the bitstream order will be correct if associated MVC view-component subsets of the MVC video sub-bitstreams of the same access unit are re-assembled in increasing order of hierarchy_layer_index.

tref_present_flag—A 1-bit flag, which when set to '0' indicates that the TREF field may be present in the PES packet headers in the associated elementary stream. The value of '1' for this flag is reserved.

hierarchy_embedded_layer_index—The hierarchy_embedded_layer_index is a 6-bit field that defines the hierarchy_layer_index of the program element that needs to be accessed and be present in decoding order before decoding of the elementary stream associated with this hierarchy_descriptor. The hierarchy_embedded_layer_index field is undefined if the hierarchy_type value is 15.

hierarchy_channel—The hierarchy_channel is a 6-bit field that indicates the intended channel number for the associated program element in an ordered set of transmission channels. The most robust transmission channel is defined by the lowest value of this field with respect to the overall transmission hierarchy definition. A given hierarchy_channel may at the same time be assigned to several program elements.

Table 2-50, below, describes the meaning of values of the hierarchy_type field of a hierarchy descriptor.

TABLE 2-50

Hierarchy_type field values

| Value | Description |
|---|---|
| 0 | Reserved |
| 1 | Spatial Scalability |
| 2 | SNR Scalability |
| 3 | Temporal Scalability |
| 4 | Data partitioning |
| 5 | Extension bitstream |
| 6 | Private Stream |
| 7 | Multi-view Profile |
| 8 | Combined Scalability |
| 9 | MVC video sub-bitstream |
| 10-14 | Reserved |
| 15 | Base layer or MVC base view sub-bitstream or AVC video sub-bitstream of MVC |

In the L-HEVC TS draft, the profile, tier, and level information (referred to as PTL information) and operation point information are signaled in HEVC extension descriptor and HEVC operation point descriptor. The syntax tables of the two descriptors are shown in the following tables.

TABLE Amd7-1

HEVC extension descriptor

| Syntax | No. of bits | Mnemonic |
|---|---|---|
| HEVC_extension_descriptor ( ) { | | |
|   descriptor_tag | 8 | uimsbf |
|   descriptor_length | 8 | uimsbf |
|   num_operation_points | 8 | uimsbf |
|   for( i=0; i < num_operation_points; i++ ) { | | |
|     profile_space | 2 | uimsbf |
|     tier_flag | 1 | bslbf |
|     profile_idc | 5 | uimsbf |
|     profile_compatibility_indication | 32 | bslbf |
|     progressive_source_flag | 1 | bslbf |
|     interlaced_source_flag | 1 | bslbf |
|     non_packed_constraint_flag | 1 | bslbf |
|     frame_only_constraint_flag | 1 | bslbf |
|     reserved_zero_44bits | 44 | bslbf |
|     level_idc | 8 | bslbf |

TABLE Amd7-1-continued

HEVC extension descriptor

| Syntax | No. of bits | Mnemonic |
|---|---|---|
|     max_temporal_id | 3 | bslbf |
|     reserved_zero_5bits | 5 | bslbf |
|     for (j =0 ; j < 64 ; j++) { | | |
|         hevc_output_layer_flag | 1 | bslbf |
|         hevc_layer_present_flag | 1 | bslbf |
|     } | 16 | uimsbf |
|     average_bit_rate | | |
|     maximum_bitrate | 16 | uimsbf |
|     frame_rate | 16 | uimsbf |
|   } | | |
| } | | |

TABLE Amd7-2

HEVC operation point descriptor

| Syntax | No. of bits | Mnemonic |
|---|---|---|
| HEVC_operation_point_descriptor( ) { | | |
|   descriptor_tag | 8 | uimsbf |
|   descriptor_length | 8 | uimsbf |
|   profile_space | 2 | uimsbf |
|   tier_flag | 1 | bslbf |
|   profile_idc | 5 | uimsbf |
|   profile_compatibility_indication | 32 | bslbf |
|   progressive_source_flag | 1 | bslbf |
|   interlaced_source_flag | 1 | bslbf |
|   non_packed_constraint_flag | 1 | bslbf |
|   frame_only_constraint_flag | 1 | bslbf |
|   reserved_zero_44bits | 44 | bslbf |
|   level_count | 8 | uimsbf |
|   for ( i = 0; i < level_count; i++ ) { | | |
|     level_idc | 8 | uimsbf |
|     operation_points_count | 8 | uimsbf |
|     for ( j = 0; j < operation_points_count; j++ ) { | | |
|       reserved | 3 | bslbf |
|       constant_frame_rate_info_idc | 2 | uimsbf |
|       applicable_temporal_id | 3 | uimsbf |
|       num_target_output_views | 8 | uimsbf |
|       ES_count | 8 | uimsbf |
|       for ( k = 0; k < ES_count; k++ ) { | | |
|         reserved | 1 | bslbf |
|         prepend_dependencies | 1 | bslbf |
|         ES_reference | 6 | uimsbf |
|       } | | |
|       if ( constant_frame_rate_info_idc > 0 ) | | |
|     { | 4 | bslbf |
|       reserved | | |
|       frame_rate_indicator | 12 | uimsbf |
|       } | | |
|     } | | |
|   } | | |
| } | | |

Figure 2:
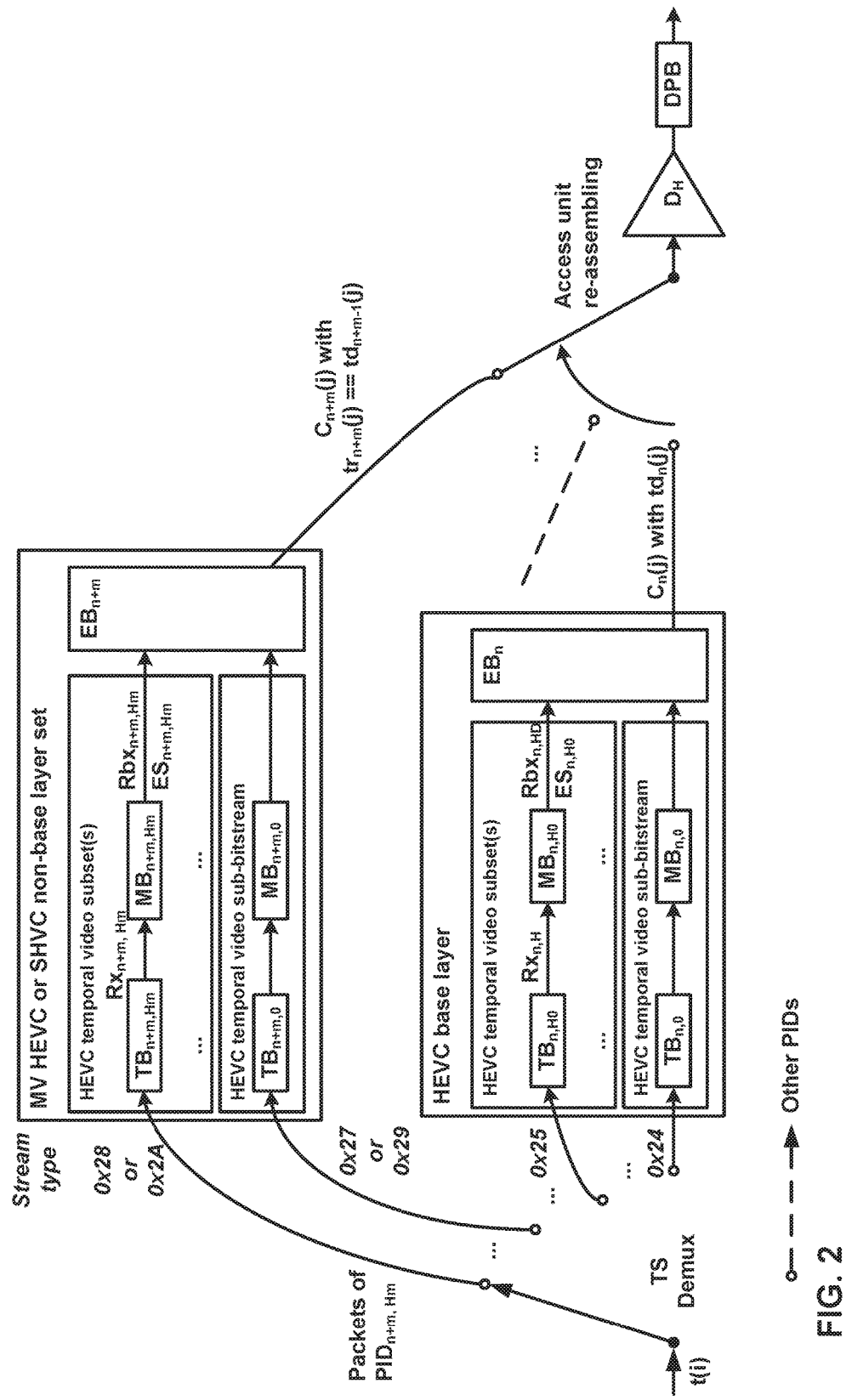
FIG. 2 is a conceptual diagram illustrating a transport system target decoder (T-STD) model extensions for bitstream-partition-specific coded picture buffer (CPB) operation.

Recently, the amendment of MPEG-2 TS for carriage of layered HEVC has been started. The latest document is "Text of ISO/IEC 13818-1:2013/Study of PDAM 7-Carriage of Layered HEVC," in MPEG document w14562, July 2014 (hereinafter, "L-HEVC TS draft"). In the L-HEVC TS draft, the current buffer model is described as follows. When there is at least one stream with a stream_type value in the range of 0x27 to 0x2A in an ITU-T Rec. H.222.0|ISO/IEC 13818-1 program, and when sub_pic_hrd_params_present_flag in the active HRD parameters syntax structure is set equal to 1 in order to signal bitstream-partition-specific coded picture buffer (CPB) operation, the transport system target decoder (T-STD) model as described in 2.4.2 is extended as illustrated in FIG. 2 and as specified below. FIG. 2 is a conceptual diagram illustrating a T-STD model extension for bitstream-partition-specific CPB operation.

The following additional notations are used to describe the T-STD extensions and are illustrated in FIG. 2.

t(i) indicates the time in seconds at which the i-th byte of the Transport Stream enters the system target decoder l is an index into the received HEVC sub-partitions of stream_type 0x27 or 0x29 (which include TemporalId 0). The order of HEVC sub-partitions is indicated by the HEVC operation point descriptor, if existing, otherwise the order is given by the dependencies indicated by hierarchy descriptors. The same index also applies to corresponding HEVC temporal enhancement sub-partitions. Here, l starts from n, which is associated with the HEVC base sub-partition, and runs up to (n+m), where m is specified below.

m is the number of received HEVC sub-partitions of stream_type 0x27 or 0x29.

Hl is the number of received HEVC corresponding temporal enhancement sub-partitions of the l-th received HEVC sub-partition of stream_type 0x27 or 0x29, associated by hierarchy descriptors with the same HEVC base sub-partition.

$ES_{l,k}$ is the received elementary stream which contains the k-th HEVC corresponding temporal enhancement sub-partition of the l-th received HEVC sub-partition of stream_type 0x27 or 0x29, or the l-th HEVC sub-partition of stream_type 0x27 or 0x29 if k equals 0.

$ES_{n+m,Hm}$ is the received elementary stream which contains the HEVC sub-partition of the highest HEVC operation point in the set of received elementary streams.

$PID_{n+m,Hm}$ is the packet identifier value which identifies $ES_{n+m,Hm}$.

j is an index to the output HEVC access units.

$C_l(j)$ is the j-th HEVC layer component of the l-th received HEVC sub-partition of stream_type 0x27 or 0x29 or HEVC corresponding temporal enhancement sub-partition.

$A_n(j)$ is the j-th HEVC access unit of the HEVC complete temporal representation.

$td_n(j)$ is the decoding time of $A_n(j)$ in the system target decoder.

$tr_l(j)$ is the value of TREF, if available in the PES header attached to $C_l(j)$, else the decoding time of $A_n(j)$ in the system target decoder.

$TB_{l,k}$ is the transport buffer for elementary stream $ES_{l,k}$.

$TBS_{l,k}$ is the size of the transport buffer $TB_{l,k}$, measured in bytes.

$MB_{l,k}$ is the multiplexing buffer for elementary stream $ES_{l,k}$.

$MBS_{l,k}$ is the size of the multiplexing buffer $MB_{l,k}$, measured in bytes.

$EB_l$ is the elementary stream buffer for the received HEVC temporal video sub-bitstream $ES_{l,0}$ and the received HEVC temporal video subsets $ES_{l,1}$ to $ES_{l,H}$. NOTE X1—Each buffer EBl contains one or more partitions as specified in Annex F of ITU-T Rec. H.265|ISO/IEC 23008-2.

$EBS_l$ is the size of elementary stream buffer $EB_l$, measured in bytes.

$Rx_{l,k}$ is the transfer rate from the k-th transport buffer $TB_{l,k}$ to the k-th multiplex buffer $MB_{l,k}$ as specified below.

$Rbx_{l,k}$ is the transfer rate from the k-th multiplex buffer $MB_{l,k}$ to the elementary stream buffer $EB_l$ as specified below. NOTE X2—The index n, where used, indicates that the received elementary streams and associated buffers belong to a certain HEVC base sub-partition, distinguishing these elementary streams and associated buffers from other elementary streams and buffers, maintaining consistency with the notation in FIG. 2 and other T-STD extensions.

With respect to TBl,k, MBl,k, EBl buffer management, the following applies:

There is one transport buffer $TB_{l,k}$ for each received elementary stream $ES_{l,k}$, where the size $TBS_{l,k}$ is fixed to 512 bytes.

There is one multiplex buffer $MB_{l,k}$ for each received elementary stream $ES_{l,k}$, where the size $MBS_{l,k}$ of the multiplex buffer $MB_{l,k}$ is constrained as follows:

$MBS_{n,k} = BS_{mux} + BS_{oh} + $ CpbBrNalFactor×MaxCPB[tier, level]−cpb_size (measured in bytes)

where $BS_{oh}$, packet overhead buffering, and $BS_{mux}$, additional multiplex buffering, are as specified in clause 2.17.2 of document N13656;

MaxCPB[tier, level] and MaxBR[tier, level] are taken from the tier and level specification of HEVC for the tier and level of the HEVC operation point associated with $ES_{l,k}$;

cpb_size is taken from the sub-layer HRD parameters, as specified in Annex F of Rec. ITU-T H.265|ISO/IEC 23008-2, included in the HEVC operation point associated with $ES_{l,k}$.

There is one elementary stream buffer $EB_l$ for the Hl+1 elementary streams in the set of received elementary streams $ES_{l,0}$ to $ESl_{m,Hl}$, with a total size $EBS_l$ $EBS_l$=cpb_size (measured in bytes)

where cpb_size is taken from the sub-layer HRD parameters, as specified in Annex F of Rec. ITU-T H.265|ISO/IEC 23008-2, included in the HEVC operation point associated with $ES_{l,H}$.

Transfer from $TB_{l,k}$ to $MB_{l,k}$ is applied as follows:

When there is no data in $TB_{l,k}$ then $Rx_{l,k}$ is equal to zero.

Otherwise, $Rx_{l,k}$=bit_rate where bit_rate is CpbBrNalFactor/CpbBrVclFactor×BitRate[i] of data flow into the CPB for the byte stream format and BitRate[i] is as defined in Rec. ITU-T H.265|ISO/IEC 23008-2 when sub-layer HRD parameters are present in the VPS for the HEVC video sub-partition in $ES_{l,k}$.

Transfer from $MB_{l,k}$ to $EB_l$ is applied as follows:

If the HEVC_timing_and_HRD_descriptor is present with the hrd_management_valid_flag set to '1' for the HEVC video sub-bitstream, then the transfer of data from $MB_{l,k}$ to $EB_l$ shall follow the HRD defined scheme for data arrival in the CPB of elementary stream $ES_{l,H}$ as defined in Annex C of Rec. ITU-T H.265|ISO/IEC 23008-2.

Otherwise, the leak method shall be used to transfer data from $MB_{l,k}$ to $EB_l$ as follows:

$Rbx_{n,k}$=CpbBrNalFactor×Max$BR$[tier,level]

where MaxBR[tier, level] is as defined for the byte stream format in the tier and level specification of in Rec. ITU T H.265|ISO/IEC 23008-2 (Table A.2) for the tier and level of the HEVC operation point resulting from re assembling (up to) the associated HEVC layered video sub-bitstream in elementary stream $ES_{l,k}$.

If there is PES packet payload data in $MB_{l,k}$ and $EB_l$ is not full, the PES packet payload is transferred from $MB_{l,k}$ to $EB_l$ at a rate equal to $Rbx_{l,k}$. If $EB_l$ is full, data are not removed from $MB_{l,k}$. When a byte of data is transferred from $MB_{l,k}$ to $EB_l$, all PES packet header bytes that are in $MB_{l,k}$ and precede that byte are instantaneously removed and discarded. When there is no PES packet payload data present in $MB_{l,k}$, no data is removed from $MB_{l,k}$. All data that enters $MB_{l,k}$ leaves it. All PES packet payload data bytes enter $EB_l$ instantaneously upon leaving $MB_{l,k}$.

The design of MPEG-2 TS for carriage of HEVC extensions described in U.S. Provisional Patent Application 62/062,681, filed Oct. 10, 2014, is related.

In addition to the descriptors indicated above, the descriptors may include one or more HEVC timing and HRD descriptors. An HEVC timing and HRD descriptor provides timing and HRD parameters for an HEVC video stream, an HEVC temporal video sub-bitstream, or an HEVC temporal video subset. Table 2-110, below, is a syntax table for an HEVC timing and HRD descriptor, as defined in document N13656.

TABLE 2-110

HEVC timing and HRD descriptor

| Syntax | No. of bits | Mnemonic |
|---|---|---|
| HEVC_timing_and_HRD_descriptor( ) { | | |
|   hrd_management_valid_flag | 1 | bslbf |
|   reserved | 6 | bslbf |
|   picture_and_timing_info_present_flag | 1 | bslbf |
|   if (picture_and_timing_info_present_flag = = '1') { | | |
|     90kHz_flag | 1 | bslbf |
|     reserved | 7 | bslbf |
|     if (90kHz_flag == '0') { | | |
|       N | 32 | uimsbf |
|       K | 32 | uimsbf |
|     } | | |
|     num_units_in_tick | 32 | uimsbf |
|   } | | |
| } | | |

In Table 2-110, hrd_management_valid_flag is a 1-bit flag is only defined for use in transport streams. When the HEVC timing and HRD descriptor is associated with an HEVC video stream or with an HEVC highest temporal sub-layer representation carried in a transport stream, then the following applies. If the hrd_management_valid_flag is set to '1', then Buffering Period SEI and Picture Timing SEI messages, as defined in Annex C of Rec. ITU-T H.265|ISO/IEC 23008-2, shall be present in the associated HEVC video stream or HEVC highest temporal sub-layer representation. These Buffering Period SEI messages shall carry coded nal_initial_cpb_removal_delay and nal_initial_cpb_removal_delay_offset values and may additionally carry nal_initial_alt_removal_delay and nal_initial_alt_cpb_removal_delay_offset values for the NAL HRD. If the hrd_management_valid_flag is set to '1', then the transfer of each byte from $MB_n$ to $EB_n$ in the T-STD as defined in 2.17.2 of document N13656 or the transfer from $MB_{n,k}$ to $EB_n$ in the T-STD as defined in 2.17.3 of document N13656 shall be according to the delivery schedule for that byte into the CPB in the NAL HRD, as determined from the coded nal_initial_cpb_removal_delay and nal_initial_cpb_removal_delay_offset or from the coded nal_initial_alt_cpb_removal_delay and nal_initial_alt_cpb_removal_delay_offset values for SchedSelIdx equal to cpb_cnt_minus1 as specified in Annex C of Rec. ITU-T H.265|ISO/IEC 23008-2. When the hrd_management_valid_flag is set to '0', the leak method shall be used for the transfer from $MB_n$ to $EB_n$ in the T-STD as defined in 2.17.2 of document N13656 or the transfer from $MB_{n,k}$ to $EB_n$ in the T-STD as defined in 2.17.3 of document N13656.

Thus, in the version of the HEVC timing and HRD descriptor specified in N13656, the value of SchedSelIdx is set equal to cpb_cnt_minus1. In HRD operations, a hypothetical stream scheduler delivers test bitstreams according to a delivery schedule indicated by SchedSelIdx.

As noted above, in the current HEVC timing and HRD descriptor, the value of SchedSelIdx is set equal to cpb_cnt_minus1. However, in the HEVC specification there is not just one (i.e., not just a single value) value of cpb_cnt_minus1, but an array of values, a respective value for each temporal sub-layer. Thus, it is at least unclear which of the values is to be used. Furthermore, for any particular value of cpb_cnt_minus1 that is greater than 0, there can be multiple delivery schedules, it is not clear why always the last delivery schedule is always chosen (i.e., selected). Lastly, in the final design of SHVC/MV-HEVC HRD, the delivery schedule for a particular output layer set is a combination of different delivery schedules for the different layers.

To overcome this problem, it is proposed in this disclosure that the value of SchedSelIdx (i.e., a schedule selection index) is explicitly signaled in an HEVC timing and HRD descriptor. For instance, a syntax element target_schedule_idx may be signaled in an HEVC timing and HRD descriptor. In one alternative, the value of SchedSelIdx is signaled within an HEVC operation point descriptor for each operation point. Thus, in one example, a video processing device (e.g., source device 12, video encoder 20) explicitly signals a value of a schedule selection index in an HEVC timing and HRD descriptor, or in a HEVC operation point descriptor for each operation point. Similarly, in one example, video decoder 30 (or destination device 14) may obtain a value of a schedule selection index that is explicitly signaled in: an HEVC timing and HRD descriptor, or a HEVC operation point descriptor for each operation point.

In the SHVC/MV-HEVC specifications, there may be one or more HRD parameters syntax structures and each partition of a bitstream refers to one of the HRD parameters syntax structures. For carriage of L-HEVC over MPEG-2 systems, currently the applicable HRD parameters for each HEVC sub-partition are not clearly specified. In other words, it is not clear which HRD parameters apply to particular HEVC sub-partitions. A HRD parameters syntax structure applicable to an HEVC sub-partition is used in performing HRD operations involving the HEVC sub-partition.

To overcome this problem, this disclosure proposes that the applicable HRD parameter for a partition is assigned to the HRD parameter set whose index is indicated by syntax element bsp_hrd_idx[TargetOlsIdx][TargetPsIdx][HighestTid][SchedSelCombIdx][partitionIdx] specified in vps_vui_bsp_hrd_params syntax table (i.e., a video parameter set video usability bitstream partition HRD parameters syntax table) of SHVC Draft Text 7 or MV-HEVC Draft Text 9. Here, the term partition is used in the SHVC/MV-HEVC context. For instance, video decoder 30 may determine that an applicable HRD parameter for a partition of a bitstream is assigned to a HRD parameter having an index indicated by a syntax element specified in a video parameter set video usability bitstream partition HRD parameters syntax table of the SHVC draft specification or MV-HEVC draft specification. Likewise, a video processing device may generate, in a video parameter set video usability bitstream partition HRD parameters syntax table of the SHVC draft specification or MV-HEVC draft specification, a syntax element that indicates an index to an applicable HRD parameter assigned to a partition of a bitstream, the partition corresponding to an applicable HRD parameter.

Thus, in some examples, a video processing device, such as video encoder 20, may generate a VPS that includes an array of syntax elements (e.g., bsp_hrd_idx[TargetOlsIdx][TargetPsIdx][HighestTid][SchedSelCombIdx][partitionIdx]) and a plurality of HRD parameters syntax structures (e.g., hrd_parameters( )). Each respective HRD parameters syntax structure of the plurality of HRD parameters syntax structures comprises a respective set of HRD parameters. Each respective syntax element of the array of syntax elements specifies an index of an HRD parameters syntax structure in the plurality of HRD parameters syntax structures.

Furthermore, the video processing device may generate a HEVC timing and HRD descriptor comprising a target schedule index syntax element (e.g., target_schedule_idx) indicating an index of a delivery schedule. The video processing device may generate a data stream, such as an MPEG-2 data stream, comprising a plurality of elementary streams and the HEVC timing and HRD descriptor. A set of parameters (e.g., bsp_hrd_idx[TargetOlsIdx][TargetPsIdx][HighestTid][SchedSelCombIdx][partitionIdx]) identifies a syntax element in the array of syntax elements that specifies an index of the particular HRD parameters syntax structure identified as being applicable to the particular elementary stream. In this example, the particular HRD parameters syntax structure is one of the plurality of HRD parameters syntax structures and the particular HRD parameters syntax structure is part of an operation point. The set of parameters may include a parameter (e.g., SchedSelCombIdx) equal having a value equal to a value of the target schedule index syntax element. Furthermore, in some examples, the set of parameters includes a second parameter (e.g., partitionIdx) whose value is determined in the manner shown in the example of FIG. 7. Additionally, the set of parameters may include a third, fourth, and fifth parameter. The third parameter (e.g., TargetOlsIdx) specifies a target output layer set index of an operation point. The fourth parameter (e.g., TargetPsIdx) specifies a target partitioning scheme index of the operation point, and the fifth parameter (e.g., HighestTid) specifies a highest temporal identifier of the operation point.

In a similar example, video decoder 30 may receive data stream, such as an MPEG-2 data stream, comprising a plurality of elementary streams and a HEVC timing and HRD descriptor. The HEVC timing and HRD descriptor comprises a target schedule index syntax element (e.g., target_schedule_idx) indicating an index of a delivery schedule. Furthermore, video decoder 30 may identify, based on a set of parameters, a syntax element in an array of syntax elements in a VPS. The VPS comprises a plurality of HRD parameters syntax structures (e.g., hrd_parameters( )). Each respective HRD parameters syntax structure of the plurality of HRD parameters syntax structures comprises a respective set of HRD parameters. Each respective syntax element of the array of syntax elements specifies an index of an HRD parameters syntax structure in the plurality of HRD parameters syntax structures. The set of parameters may include a parameter (e.g., SchedSelCombIdx) having a value equal to a value of the target schedule index syntax element. Furthermore, in some examples, the set of parameters includes a second parameter (e.g., partitionIdx) whose value is determined in the manner shown in the example of FIG. 7. Additionally, the set of parameters may include a third, fourth, and fifth parameter. The third parameter (e.g., TargetOlsIdx) specifies a target output layer set index of an operation point. The fourth parameter (e.g., TargetPsIdx) specifies a target partitioning scheme index of the operation point, and the fifth parameter (e.g., HighestTid) specifies a highest temporal identifier of the operation point. Furthermore, in this example, video decoder 30 may identify, based on an index specified by the identified syntax element, a particular HRD parameters syntax structure in the plurality of HRD parameters syntax structures as being applicable to a particular elementary stream that is part of the operation point. The plurality of elementary streams includes the particular elementary stream.

At the Sapporo meeting of the JCT-VC and JCT-3V groups, it was agreed that profile, tier and level (PTL) information is associated with each layer, instead of with each output layer set or operation point. This decision has an impact on the design of the buffer model in the L-HEVC TS draft because of the following two facts. First, currently an elementary stream is an HEVC sub-partition (e.g., HEVC base sub-partition, HEVC enhancement sub-partition or HEVC temporal enhancement sub-partition) and one or more layers can be transported within an elementary stream. Second, each elementary stream in the buffer model goes through the Transport Buffer ($TB_n$), the Multiplexing Buffer ($MB_n$) and the Elementary stream Buffer ($EB_n$).

Currently, the size of $MB_n$ is calculated based on the following equation:

$$MBS_{n,k} = BS_{mux} + BS_{oh} + CpbBrNalFactor \times MaxCPB[tier, level] - cpb\_size \text{ (measured in bytes)}$$

where $BS_{mux}$, $BS_{oh}$ and MaxCPB[tier, level] depend on PTL information. In the equation above, $BS_{oh}$, packet overhead buffering, and $BS_{mux}$, additional multiplex buffering, are as specified in clause 2.17.2 of document N13656. MaxCPB[tier, level] and MaxBR[tier, level] are taken from the tier and level specification of HEVC for the tier and level of $ES_{l,k}$ the HEVC operation point associated with ESl,k. cpb_size is taken from the sub-layer HRD parameters within the applicable hrd_parameters( ), as specified in Annex F of Rec. ITU-T H.265|ISO/IEC 23008-2, for the HEVC operation point associated with ESl,k. When an elementary stream has more than one layer, there is more than one set of PTL information available. As a result, it is not clear from which set of PTL information the value of $BS_{mux}$, $BS_{oh}$ and MaxCPB[tier, level] should be calculated or derived from.

To overcome this problem, this disclosure proposes to constrain (i.e., restrict or require) each elementary stream (i.e., an HEVC sub-partition) to contain no more than one layer. For example, a video processing device (e.g., source device 12, video encoder 20) may generate a data stream (e.g., an MPEG-2 program stream or transport stream) comprising one or more elementary streams. In this example, the data stream is subject to a constraint that each of the one or more elementary streams contains no more than one layer. In a similar example, video decoder 30 may decode video data of a data stream (e.g., an MPEG-2 program stream or transport stream) comprising one or more elementary streams. In this example, the data stream is subject to a constraint that each of the one or more elementary streams contains no more than one layer.

As described above, the HEVC timing and HRD descriptor provides timing and HRD parameters. The current HEVC timing and HRD descriptor does not specify whether the current HEVC timing and HRD descriptor is a program-level descriptor or a program element-level descriptor. Both of the following are possible. First, the HEVC timing and HRD descriptor may be signaled as a program-level descriptor. When HEVC timing and HRD descriptor is signaled as a program-level descriptor, there should be only one instance of that the HRD timing and HRD descriptor as this single instance of the HEVC timing and HRD descriptor applies to all elementary streams with stream_type 0x24, 0x25, 0x27~0x2A. Second, the HEVC timing and HRD descriptor is signaled as a program-element-level descriptor. The descriptor applies to only a specific elementary stream. This allows the possibility that the HEVC timing and HRD descriptor is present for some elementary streams and not present for some other elementary streams. While such scenario is possible, there seems to be no advantage of such a finer granular signaling.

To overcome this problem, the disclosure proposes the following. When present, the HEVC timing and HRD descriptor shall be signaled as program level descriptor. When present, there shall be at most one HEVC timing and HRD descriptor for an ITU-T Rec. H.222.0|ISO/IEC 13818-1. Thus, in some examples, a video processing device (e.g., source device 12, video encoder 20) generates, in a MPEG-2 data stream conforming to the ITU-T Recommendation H.222.0 standard, a HEVC timing and HRD descriptor as a program level descriptor, wherein it is required that there is at most one HEVC timing and HRD descriptor in the MPEG-2 data stream. In a similar example, video decoder 30 obtains, from an MPEG-2 data stream conforming to the ITU-T Recommendation H.222.0 standard, a HEVC timing and HRD descriptor as a program level descriptor, wherein it is required (e.g., as a condition of bitstream conformance) that there is at most one HEVC timing and HRD descriptor in the MPEG-2 data stream.

In the description of the HEVC timing and HRD descriptor in document N13656, it is specified that if the hrd_management_valid_flag is equal to '1', then buffering period and picture timing SEI messages shall be present in the associated HEVC video stream or HEVC highest temporal sub-layer representation. However, there is no further description in document of N13656 of the presence of those SEI messages. One problem that may occur is that the SEI messages are present but may be applicable to only some or even none of operation points defined in the HEVC operation point descriptor. As noted above, the hrd_management_valid_flag is specified in the HEVC timing and HRD descriptor.

To avoid the above problem, this disclosure proposes that it should be specified that if the hrd_management_valid_flag is equal to 1, then buffering period SEI messages and picture timing SEI messages applicable for each of the operation points signaled in an HEVC operation point descriptor shall be present in the HEVC video stream.

Thus, to overcome this problem, it is proposed to have a constraint (i.e., a restriction or requirement) such that if the hrd_management_valid_flag of a HEVC timing and HRD descriptor is equal to 1, then buffering period SEI messages and picture timing SEI messages applicable for each of the operation points signaled in the HEVC operation descriptor shall be present in the HEVC video stream. Thus, in some examples, a video processing device (e.g., source device 12, video encoder 20) generates a program stream or transport stream that is subject to a constraint such that if the hrd_management_valid_flag of an HEVC timing and HRD descriptor is equal to 1, then buffering period SEI messages and picture timing SEI messages applicable for each operation point signaled in a HEVC operation descriptor shall be present in the HEVC video stream. In some examples, video decoder 30 (or destination device 14) decodes video data of a program stream or transport stream that is subject to a constraint such that if the hrd_management_valid_flag of the HEVC timing and HRD descriptor is equal to 1, then buffering period SEI and picture timing SEI messages applicable for each operation point signaled in a HEVC operation descriptor shall be present in the HEVC video stream.

In JCTVC-R1013, the term "decoding unit" is defined as an access unit if SubPicHrdFlag is equal to 0 or a subset of an access unit otherwise, consisting of one or more VCL NAL units in an access unit and the associated non-VCL NAL units. If the decoding process is invoked in a bitstream conformance test as specified in clause C.1 of JCTVC-R1013, when sub_pic_hrd_params_present_flag in the selected hrd_parameters( ) syntax structure is equal to 1, the CPB is scheduled to operate either at the access unit level (in which case the variable SubPicHrdFlag is set equal to 0) or at the sub-picture level (in which case the variable SubPicHrdFlag is set equal to 1). Otherwise, SubPicHrdFlag is set equal to 0 and the CPB is scheduled to operate at the partition unit level. Otherwise, if the decoding process is not invoked in a bitstream conformance test as specified in clause C.1 of JCTVC-R1013, SubPicHrdFlag is set equal to (SubPicHrdPreferredFlag && sub_pic_hrd_params_present_flag). The variable SubPicHrdPreferredFlag is either specified by external means, or when not specified by external means, set equal to 0.

The current buffer model in the L-HEVC TS draft does not support an ultralow delay buffer model. Data in terms of bytes are removed from the elementary stream buffer (EB) based on the given decoding timestamp (DTS) which is bound at an access unit level, that is, there is only one value of DTS for the whole access unit. As such, all the data (i.e., all the bytes) associated with a given access unit is removed from the elementary stream based on the given DTS. Such a method means that the ultralow delay mode in which data is expected to be removed from the CPB before the whole access unit is available in the CPB is not supported.

To overcome this problem, this disclosure proposes following:

Providing a definition of decoding unit in the MPEG-2 systems.

For each program that contains a video stream, signaling an indication of the granularity of the decoding unit (e.g., access unit, collection of pictures within an access unit, picture, slice, slice segment).

Each PES packet that belongs to the same access unit may have a different DTS; however DTS of PES packets that belong to the same decoding unit must be the same.

Removal of pictures from an elementary stream buffer is based on DTS value.

An alternative solution for the above technique can be as follows. The removal of data from elementary stream takes into account the presence of decoding unit information SEI messages when they are present in the video stream.

As indicated above, in accordance with a technique of this disclosure, for each program that contains a video stream, an indication of the granularity of the decoding unit is signaled. Thus, in one example, a video processing device (e.g., destination device 14, video decoder 30) receives a data stream and obtains, for each program of the data stream that contains a video stream, an indication of a granularity of a decoding unit. In a similar example, a video processing device (e.g., source device 12, video encoder 20) may generate a data stream that includes, for each program of the data stream that contains a video stream, an indication of a granularity of a decoding unit. In these examples, the granularity of the decoding unit may be one of: an access unit, a collection of pictures within an access unit, a picture, a slice, or a slice segment.

Furthermore, as indicated above, in accordance with a technique of this disclosure, each PES packet that belongs to the same access unit may have different DTS while DTSs of PES packets that belong to the same decoding unit must be the same. Hence, in at least some such examples, each PES packet that belongs to the same access unit may have different DTSs and DTSs of PES packets that belong to the same decoding unit are required to be the same.

Additionally, as indicated above, in accordance with a technique of this disclosure, removal of pictures from an elementary stream buffer may be based on DTS value. Thus, in one such example, a video decoder may store data into a buffer and remove data from the buffer before a whole access unit of the data is available in the buffer.

This disclosure proposes several techniques. Some of these techniques may be applied independently and some of them may be applied in combination.

Figure 3:
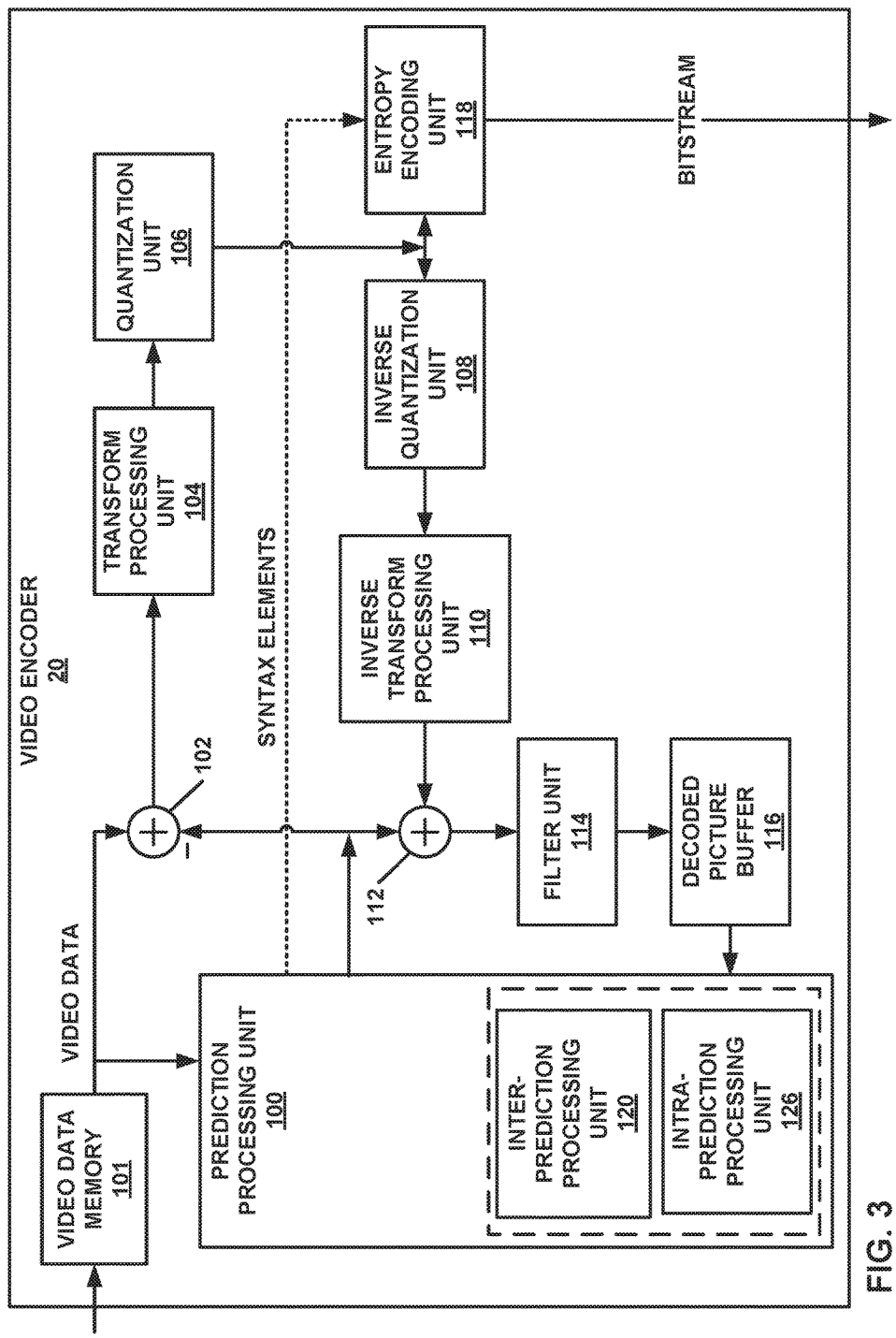
FIG. 3 is a block diagram illustrating an example video encoder that may implement the techniques described in this disclosure.

FIG. 3 is a block diagram illustrating an example video encoder 20 that may implement the techniques of this disclosure. FIG. 3 is provided for purposes of explanation and should not be considered limiting of the techniques as broadly exemplified and described in this disclosure. For purposes of explanation, this disclosure describes video encoder 20 in the context of HEVC coding. However, the techniques of this disclosure may be applicable to other coding standards or methods. Video encoder 20 represents an example of a device that may be configured to perform techniques of this disclosure.

In the example of FIG. 3, video encoder 20 includes a prediction processing unit 100, video data memory 101, a residual generation unit 102, a transform processing unit 104, a quantization unit 106, an inverse quantization unit 108, an inverse transform processing unit 110, a reconstruction unit 112, a filter unit 114, a decoded picture buffer 116, and an entropy encoding unit 118. Prediction processing unit 100 includes an inter-prediction processing unit 120 and an intra-prediction processing unit 126. Inter-prediction processing unit 120 includes a motion estimation unit and a motion compensation unit (not shown). In other examples, video encoder 20 may include more, fewer, or different functional components.

Video data memory 101 may store video data to be encoded by the components of video encoder 20. The video data stored in video data memory 101 may be obtained, for example, from video source 18. Decoded picture buffer 116 may be a reference picture memory that stores reference video data for use in encoding video data by video encoder 20, e.g., in intra- or inter-coding modes. Video data memory 101 and decoded picture buffer 116 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 101 and decoded picture buffer 116 may be provided by the same memory device or separate memory devices. In various examples, video data memory 101 may be on-chip with other components of video encoder 20, or off-chip relative to those components.

Video encoder 20 receives video data. Video encoder 20 may encode each CTU in a slice of a picture of the video data. Each of the CTUs may be associated with equally-sized luma coding tree blocks (CTBs) and corresponding CTBs of the picture. As part of encoding a CTU, prediction processing unit 100 may perform quad-tree partitioning to divide the CTBs of the CTU into progressively-smaller blocks. The smaller block may be coding blocks of CUs. For example, prediction processing unit 100 may partition a CTB associated with a CTU into four equally-sized sub-blocks, partition one or more of the sub-blocks into four equally-sized sub-sub-blocks, and so on.

Video encoder 20 may encode CUs of a CTU to generate encoded representations of the CUs (i.e., coded CUs). As part of encoding a CU, prediction processing unit 100 may partition the coding blocks associated with the CU among one or more PUs of the CU. Thus, each PU may be associated with a luma prediction block and corresponding chroma prediction blocks. Video encoder 20 and video decoder 30 may support PUs having various sizes. As indicated above, the size of a CU may refer to the size of the luma coding block of the CU and the size of a PU may refer to the size of a luma prediction block of the PU. Assuming that the size of a particular CU is 2N×2N, video encoder 20 and video decoder 30 may support PU sizes of 2N×2N or N×N for intra prediction, and symmetric PU sizes of 2N×2N, 2N×N, N×2N, N×N, or similar for inter prediction. Video encoder 20 and video decoder 30 may also support asymmetric partitioning for PU sizes of 2N×nU, 2N×nD, nL×2N, and nR×2N for inter prediction.

Inter-prediction processing unit 120 may generate predictive data for a PU by performing inter prediction on each PU of a CU. The predictive data for the PU may include predictive blocks of the PU and motion information for the PU. Inter-prediction processing unit 120 may perform different operations for a PU of a CU depending on whether the PU is in an I slice, a P slice, or a B slice. In an I slice, all PUs are intra predicted. Hence, if the PU is in an I slice, inter-prediction processing unit 120 does not perform inter prediction on the PU. Thus, for blocks encoded in I-mode, the predicted block is formed using spatial prediction from previously-encoded neighboring blocks within the same frame. If a PU is in a P slice, inter-prediction processing unit 120 may use uni-directional inter prediction to generate a predictive block of the PU. If a PU is in a B slice, inter-prediction processing unit 120 may use uni-directional or bi-directional inter prediction to generate a predictive block of the PU.

Intra-prediction processing unit 126 may generate predictive data for a PU by performing intra prediction on the PU. The predictive data for the PU may include predictive blocks of the PU and various syntax elements. Intra-prediction processing unit 126 may perform intra prediction on PUs in I slices, P slices, and B slices.

To perform intra prediction on a PU, intra-prediction processing unit 126 may use multiple intra prediction modes to generate multiple sets of predictive data for the PU. Intra-prediction processing unit 126 may use samples from sample blocks of neighboring PUs to generate a predictive block for a PU. The neighboring PUs may be above, above and to the right, above and to the left, or to the left of the PU, assuming a left-to-right, top-to-bottom encoding order for PUs, CUs, and CTUs. Intra-prediction processing unit 126 may use various numbers of intra prediction modes, e.g., 33 directional intra prediction modes. In some examples, the number of intra prediction modes may depend on the size of the region associated with the PU.

Prediction processing unit 100 may select the predictive data for PUs of a CU from among the predictive data generated by inter-prediction processing unit 120 for the PUs or the predictive data generated by intra-prediction processing unit 126 for the PUs. In some examples, prediction processing unit 100 selects the predictive data for the PUs of the CU based on rate/distortion metrics of the sets of predictive data. The predictive blocks of the selected predictive data may be referred to herein as the selected predictive blocks.

Residual generation unit 102 may generate, based on the coding blocks (e.g., luma, Cb and Cr coding blocks) for a CU and the selected predictive blocks (e.g., predictive luma, Cb and Cr blocks) for the PUs of the CU, residual blocks (e.g., luma, Cb and Cr residual blocks) for the CU. For instance, residual generation unit 102 may generate the residual blocks of the CU such that each sample in the residual blocks has a value equal to a difference between a sample in a coding block of the CU and a corresponding sample in a corresponding selected predictive block of a PU of the CU.

Transform processing unit 104 may perform quad-tree partitioning to partition the residual blocks associated with a CU into transform blocks associated with TUs of the CU. Thus, a TU may be associated with a luma transform block and two chroma transform blocks. The sizes and positions of the luma and chroma transform blocks of TUs of a CU may or may not be based on the sizes and positions of prediction blocks of the PUs of the CU. A quad-tree structure known as a "residual quad-tree" (RQT) may include nodes associated with each of the regions. The TUs of a CU may correspond to leaf nodes of the RQT.

Transform processing unit 104 may generate transform coefficient blocks for each TU of a CU by applying one or more transforms to the transform blocks of the TU. Transform processing unit 104 may apply various transforms to a transform block associated with a TU. For example, transform processing unit 104 may apply a discrete cosine transform (DCT), a directional transform, or a conceptually similar transform to a transform block. In some examples, transform processing unit 104 does not apply transforms to a transform block. In such examples, the transform block may be treated as a transform coefficient block.

Quantization unit 106 may quantize the transform coefficients in a coefficient block. The quantization process may reduce the bit depth associated with some or all of the transform coefficients. For example, an n-bit transform coefficient may be rounded down to an m-bit transform coefficient during quantization, where n is greater than m. Quantization unit 106 may quantize a coefficient block associated with a TU of a CU based on a quantization parameter (QP) value associated with the CU. Video encoder 20 may adjust the degree of quantization applied to the coefficient blocks associated with a CU by adjusting the QP value associated with the CU. Quantization may introduce loss of information, thus quantized transform coefficients may have lower precision than the original ones.

Inverse quantization unit 108 and inverse transform processing unit 110 may apply inverse quantization and inverse transforms to a coefficient block, respectively, to reconstruct a residual block from the coefficient block. Reconstruction unit 112 may add the reconstructed residual block to corresponding samples from one or more predictive blocks generated by prediction processing unit 100 to produce a reconstructed transform block associated with a TU. By reconstructing transform blocks for each TU of a CU in this way, video encoder 20 may reconstruct the coding blocks of the CU.

Filter unit 114 may perform one or more deblocking operations to reduce blocking artifacts in the coding blocks associated with a CU. Decoded picture buffer 116 may store the reconstructed coding blocks after filter unit 114 performs the one or more deblocking operations on the reconstructed coding blocks. Inter-prediction processing unit 120 may use a reference picture that contains the reconstructed coding blocks to perform inter prediction on PUs of other pictures. In addition, intra-prediction processing unit 126 may use reconstructed coding blocks in decoded picture buffer 116 to perform intra prediction on other PUs in the same picture as the CU.

Entropy encoding unit 118 may receive data from other functional components of video encoder 20. For example, entropy encoding unit 118 may receive coefficient blocks from quantization unit 106 and may receive syntax elements from prediction processing unit 100. Entropy encoding unit 118 may perform one or more entropy encoding operations on the data to generate entropy-encoded data. For example, entropy encoding unit 118 may perform a CABAC operation, a context-adaptive variable length coding (CAVLC) operation, a variable-to-variable (V2V) length coding operation, a syntax-based context-adaptive binary arithmetic coding (SBAC) operation, a Probability Interval Partitioning Entropy (PIPE) coding operation, an Exponential-Golomb encoding operation, or another type of entropy encoding operation on the data. Video encoder 20 may output a bitstream that includes entropy-encoded data generated by entropy encoding unit 118. For instance, the bitstream may include data that represents a RQT for a CU.

Figure 4:
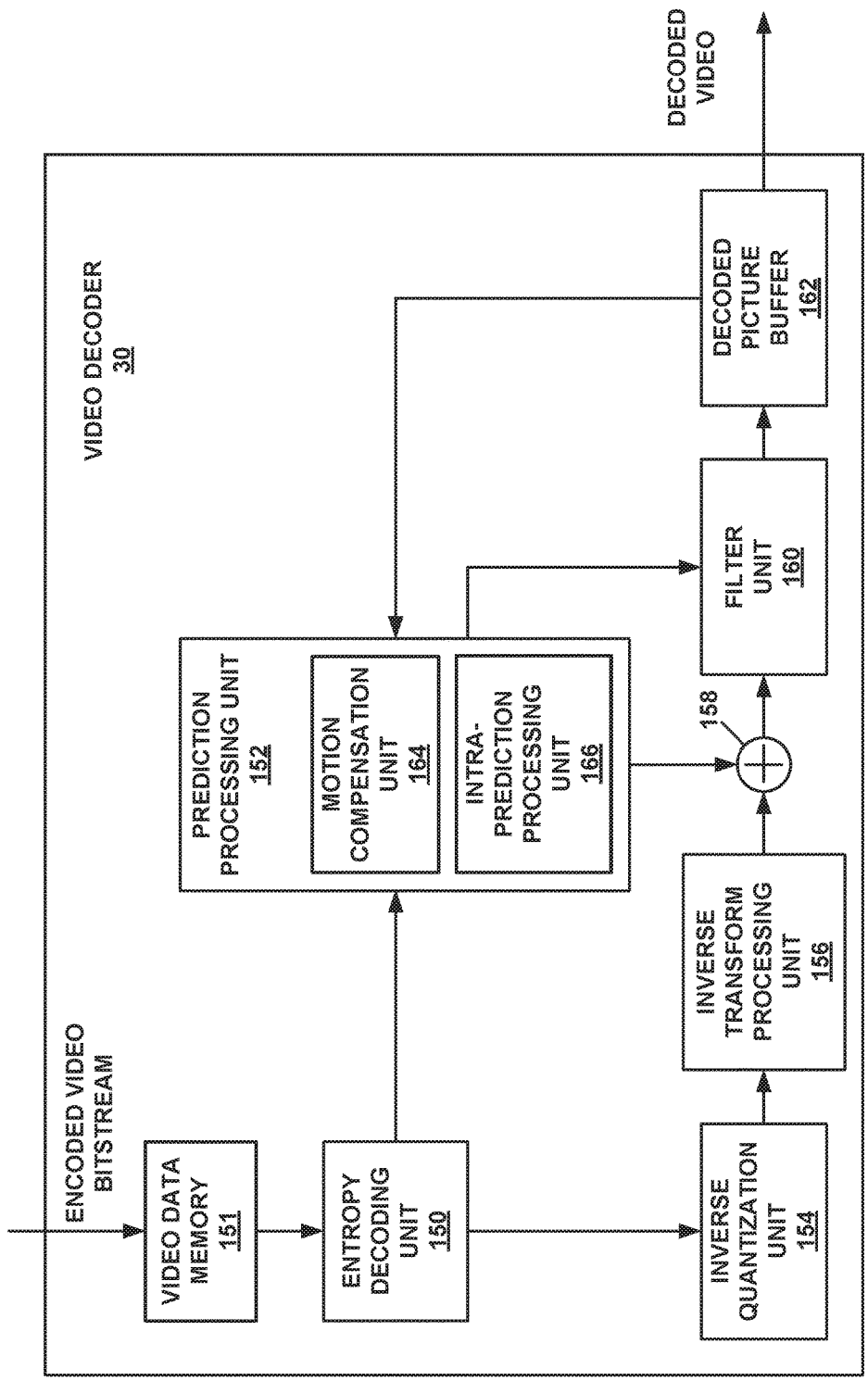
FIG. 4 is a block diagram illustrating an example video decoder that may implement the techniques described in this disclosure.

FIG. 4 is a block diagram illustrating an example video decoder 30 that is configured to implement the techniques of this disclosure. FIG. 4 is provided for purposes of explanation and is not limiting on the techniques as broadly exemplified and described in this disclosure. For purposes of explanation, this disclosure describes video decoder 30 in the context of HEVC coding. However, the techniques of this disclosure may be applicable to other coding standards or methods.

In the example of FIG. 4, video decoder 30 includes an entropy decoding unit 150, video data memory 151, a prediction processing unit 152, an inverse quantization unit 154, an inverse transform processing unit 156, a reconstruction unit 158, a filter unit 160, and a decoded picture buffer 162. Prediction processing unit 152 includes a motion compensation unit 164 and an intra-prediction processing unit 166. In other examples, video decoder 30 may include more, fewer, or different functional components.

Video data memory 151 may store video data, such as an encoded video bitstream, to be decoded by the components of video decoder 30. The video data stored in video data memory 151 may be obtained, for example, from channel 16, e.g., from a local video source, such as a camera, via wired or wireless network communication of video data, or by accessing physical data storage media. Video data memory 151 may form a coded picture buffer (CPB) that stores encoded video data from an encoded video bitstream. Decoded picture buffer 162 may be a reference picture memory that stores reference video data for use in decoding video data by video decoder 30, e.g., in intra- or inter-coding modes. Video data memory 151 and decoded picture buffer 162 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 151 and decoded picture buffer 162 may be provided by the same memory device or separate memory devices. In various examples, video data memory 151 may be on-chip with other components of video decoder 30, or off-chip relative to those components.

CPB 151 receives and stores encoded video data (e.g., NAL units) of a bitstream. Entropy decoding unit 150 may receive encoded video data (e.g., NAL units) from the CPB and parse the NAL units to obtain syntax elements. Entropy decoding unit 150 may entropy decode entropy-encoded syntax elements in the NAL units. Prediction processing unit 152, inverse quantization unit 154, inverse transform processing unit 156, reconstruction unit 158, and filter unit 160 may generate decoded video data based on the syntax elements extracted from the bitstream. Entropy decoding unit 150 may perform a process generally reciprocal to that of entropy encoding unit 118.

In addition to obtaining syntax elements from the bitstream, video decoder 30 may perform a reconstruction operation on a non-partitioned CU. To perform the reconstruction operation on a CU, video decoder 30 may perform a reconstruction operation on each TU of the CU. By performing the reconstruction operation for each TU of the CU, video decoder 30 may reconstruct residual blocks of the CU.

As part of performing a reconstruction operation on a TU of a CU, inverse quantization unit 154 may inverse quantize, i.e., de-quantize, coefficient blocks associated with the TU. Inverse quantization unit 154 may use a QP value associated with the CU of the TU to determine a degree of quantization and, likewise, a degree of inverse quantization for inverse quantization unit 154 to apply. That is, the compression ratio, i.e., the ratio of the number of bits used to represent original sequence and the compressed one, may be controlled by adjusting the value of the QP used when quantizing transform coefficients. The compression ratio may also depend on the method of entropy coding employed.

After inverse quantization unit 154 inverse quantizes a coefficient block, inverse transform processing unit 156 may apply one or more inverse transforms to the coefficient block in order to generate a residual block associated with the TU. For example, inverse transform processing unit 156 may apply an inverse DCT, an inverse integer transform, an inverse Karhunen-Loeve transform (KLT), an inverse rotational transform, an inverse directional transform, or another inverse transform to the coefficient block.

If a PU is encoded using intra prediction, intra-prediction processing unit 166 may perform intra prediction to generate predictive blocks of the PU. Intra-prediction processing unit 166 may use an intra prediction mode to generate the predictive blocks of the PU based on samples spatially-neighboring blocks. Intra-prediction processing unit 166 may determine the intra prediction mode for the PU based on one or more syntax elements obtained from the bitstream.

If a PU is encoded using inter prediction, entropy decoding unit 150 may determine motion information for the PU. Motion compensation unit 164 may determine, based on the motion information of the PU, one or more reference blocks. Motion compensation unit 164 may generate, based on the one or more reference blocks, predictive blocks (e.g., predictive luma, Cb and Cr blocks) for the PU.

Reconstruction unit 158 may use transform blocks (e.g., luma, Cb and Cr transform blocks) for TUs of a CU and the predictive blocks (e.g., luma, Cb and Cr blocks) of the PUs of the CU, i.e., either intra-prediction data or inter-prediction data, as applicable, to reconstruct the coding blocks (e.g., luma, Cb and Cr coding blocks) for the CU. For example, reconstruction unit 158 may add samples of the transform blocks (e.g., luma, Cb and Cr transform blocks) to corresponding samples of the predictive blocks (e.g., luma, Cb and Cr predictive blocks) to reconstruct the coding blocks (e.g., luma, Cb and Cr coding blocks) of the CU.

Filter unit 160 may perform a deblocking operation to reduce blocking artifacts associated with the coding blocks of the CU. Video decoder 30 may store the coding blocks of the CU in decoded picture buffer 162. Decoded picture buffer 162 may provide reference pictures for subsequent motion compensation, intra prediction, and presentation on a display device, such as display device 32 of FIG. 1. For instance, video decoder 30 may perform, based on the blocks in decoded picture buffer 162, intra prediction or inter prediction operations for PUs of other CUs.

It should be understood that all of the techniques described herein may be used individually or in combination. It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially. In addition, while certain aspects of this disclosure are described as being performed by a single module or unit for purposes of clarity, it should be understood that the techniques of this disclosure may be performed by a combination of units or modules associated with a video coder.

Certain aspects of this disclosure have been described with respect to the HEVC standard for purposes of illustration. However, the techniques described in this disclosure may be useful for other video coding processes, including other standard or proprietary video coding processes not yet developed.

The techniques described above may be performed by video encoder 20 (FIGS. 1 and 3) and/or video decoder 30 (FIGS. 1 and 4), both of which may be generally referred to as a video coder. Likewise, video coding may refer to video encoding or video decoding, as applicable.

This following section of this disclosure describes an example implementation of the techniques described elsewhere in this disclosure. The suggested text to implement the above proposals are shown below. The removed text is shown as italicized text enclosed in double square brackets (e.g., [[text]]) whereas the additional text is shown as underlined text.

5.1 The Modification to HEVC Timing and HRD Descriptor
Replace the Content of Section 2.6.97 of the Current L-HEVC TS Draft with the Following:

For an HEVC video stream, the HEVC timing and HRD descriptor provides applicable timing and HRD parameters, as defined in Annex C of Rec. ITU-T H.265|ISO/IEC 23008-2. There shall be at most one instance of HEVC timing and HRD descriptor and shall be included in the group of data elements following immediately the program_info_length field in the program_map section, unless the HEVC video stream carries VPS parameter with the vps_timing_info_present_flag set to '1'.

Absence of the HEVC timing and HRD descriptor in the PMT for an HEVC video stream or a re-assembled HEVC video stream signals usage of the leak method in the T-STD. But such usage can also be signaled by the hrd_management_valid_flag set to '0' in the HEVC timing and HRD descriptor. If the transfer rate into buffer EB1 can be determined from HRD parameters contained in an HEVC video stream or an AVC video stream re-assembled from video sub-bitstreams, then the AVC timing and HRD descriptor with the hrd_management_valid_flag set to '1' shall be included in the PMT for that HEVC video stream or for the re-assembled HEVC video stream. (See Table 2-103septiens.)

TABLE 2-103septiens

HEVC timing and HRD descriptor

| Syntax | No. Of bits | Mnemonic |
|---|---|---|
| HEVC_timing_and_HRD_descriptor( ) { | | |
|   hrd_management_valid_flag | 1 | bslbf |
|   reserved | [[6]]1 | bslbf |
|   target_schedule_idx | 5 | uimsbf |
|   picture_and_timing_info_present_flag | 1 | bslbf |
|   if (picture_and_timing_info_present_flag == '1') { | | |
|     90kHz_flag | 1 | bslbf |
|     reserved | 7 | bslbf |
|     if (90kHz_flag == '0') { | | |
|       N | 32 | uimsbf |
|       K | 32 | uimsbf |
|     } | | |
|     num_units_in_tick | 32 | uimsbf |
|   } | | |
| } | | |

Replace the Content of Section 2.6.98 of the Current L-HEVC TS Draft with the Following:

hrd_management_valid_flag—This 1-bit flag is only defined for use in transport streams. When the HEVC timing and HRD descriptor is associated with an HEVC video stream [[or with an HEVC highest temporal sub-layer representation]] carried in a transport stream, then the following apply.

If the hrd_management_valid_flag is equal to '1', then Buffering Period SEI and Picture Timing SEI messages, as defined in Annex C of Rec. ITU-T H.265|ISO/IEC 23008-2, shall be present in the associated HEVC video stream [[or HEVC highest temporal sub-layer representation]] and each operation points signaled in HEVC operation descriptor shall have applicable Buffering Period SEI and Picture Timing SEI messages. These Buffering Period SEI messages shall carry coded nal_initial_cpb_removal_delay and nal_initial_cpb_removal_offset values and may additionally carry nal_initial_alt_removal_delay and nal_initial_alt_cpb_removal_offset values for the NAL HRD. If the hrd_management_valid_flag is set to '1', then the transfer of each byte from MB$_n$ to EB$_n$ in the T-STD as defined in 2.17.2 of document N13656 or the transfer from MB$_{n,k}$ to EB$_n$ in the T-STD as defined in 2.17.3 of document N13656 or the transfer of each byte from MB$_n$ to EB$_n$ in the T-STD as defined in 2.17.4 of document N13656 shall be according to the delivery schedule for that byte into the CPB in the NAL HRD, as determined from the coded nal_initial_cpb_removal_delay and nal_initial_cpb_removal_offset or from the coded nal_initial_alt_cpb_removal_delay and nal_initial_alt_cpb_removal_offset values for SchedSelIdx equal to target_schedule_idx as specified in Annex C of Rec. ITU-T H.265|ISO/IEC 23008-2. When the hrd_management_valid_flag is set to '0', the leak method shall be used for the transfer from MB$_n$ to EB$_n$ in the T-STD as defined in 2.17.[[3]]4.

When HEVC_timing_and_HRD_descriptor is present and the value of hrd_management_valid_flag is equal to 1, the applicable HRD parameter for elementary stream esA that is part of operation point opA is the bsp_hrd_idx [TargetOlsIdx][TargetPsIdx][HighestTid][SchedSelCombIdx][partitionIdx]-th hrd_parameters( ) syntax structure in the active VPS of the HEVC video stream where:

TargetOlsIdx is equal to the target_ols of opA,
TargetPsIdx is equal to the target_partitioning_scheme of opA,
HighestTid is equal to the max_temporal_id of opA,
SchedSelCombIdx is equal to target_schedule_idx
partitionIdx is equal to idxA that is defined as follow:
Let listA be the list of elementary stream with stream_type equal to 0x24, 0x27 or 0x29 that is contained in opA in ascending order according to their hierarchy layer index value present in the hierarchy descriptor or hierarchy extension descriptor. If esA is member of listA, idxA is the index of esA in listA, otherwise, idxA is the index of esB in listA where esA is a complimentary temporal enhancement of esB.

target_schedule_idx—This 5-bit field indicates the index of delivery schedule which is assigned for SchedSelIdx. When the value of hrd_management_valid_flag is equal to 0, then the meaning of the target_schedule_idx is not defined.

picture_and_timing_info_present_flag—This 1-bit flag when set to '1' indicates that the 90 kHz_flag and parameters for accurate mapping to a 90-kHz system clock are included in this descriptor.

90 kHz_flag—This 1-bit flag when set to '1' indicates that the frequency of the HEVC time base is 90 kHz.

N, K—For an HEVC video stream [[or HEVC highest temporal sub-layer representation]], the frequency of the HEVC time base is defined by the syntax element vui_time_scale in the VUI parameters, as defined in Annex E of Rec. ITU-T H.265|ISO/IEC 23008-2. The relationship between the HEVC time_scale and the STC shall be defined by the parameters N and K in this descriptor as follows.

$$time\_scale = (N \times system\_clock\_frequency)/K$$

If the 90 kHz_flag is set to '1', then N equals 1 and K equals 300. If the 90 kHz_flag is set to '0', then the values of N and K are provided by the coded values of the N and K fields.

NOTE—This allows mapping of time expressed in units of time_scale to 90 kHz units, as needed for the calculation of PTS and DTS timestamps, for example in decoders for HEVC access units for which no PTS or DTS is encoded in the PES header.

num_units_in_tick—This 32-bit field is coded exactly in the same way as the vui_num_units_in_tick field in VUI parameters in Annex E of Rec. ITU-T H.265|ISO/IEC 23008-2. The information provided by this field shall apply to the entire HEVC video stream [[or HEVC highest temporal sub-layer representation]] to which the HEVC timing and HRD descriptor is associated.

Figure 5:
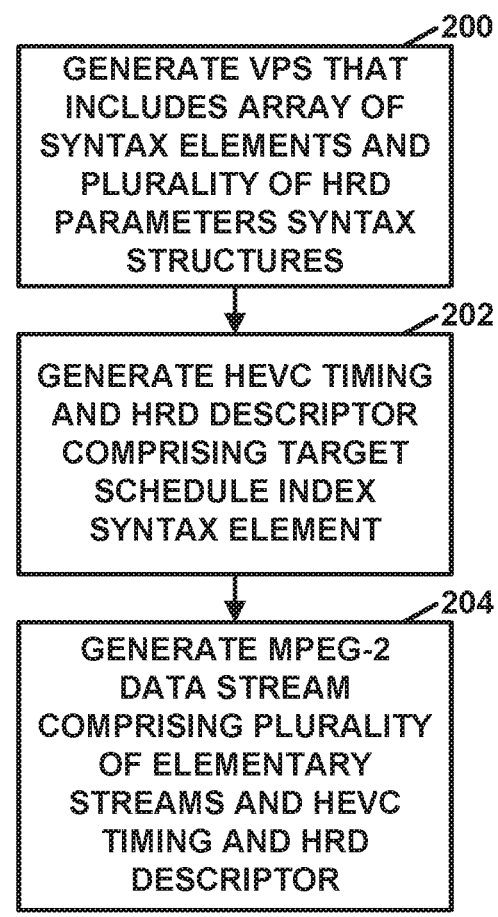
FIG. 5 is a flowchart illustrating an example operation of a video encoder, in accordance with a technique of this disclosure.

FIG. 5 is a flowchart illustrating an example operation of a video encoder, in accordance with a technique of this disclosure. The flowcharts of this disclosure are provided as examples. In other examples of this disclosure, there may be more, fewer, or different actions, and/or the actions may be performed in a different order or in parallel.

In the example of FIG. 5, video encoder 20 generates a VPS that includes an array of syntax elements (e.g., bsp_hrd_idx[TargetOlsIdx][TargetPsIdx][HighestTid][SchedSelCombIdx][partitionIdx]) and a plurality of HRD parameters syntax structures (200). Each respective HRD parameters syntax structure of the plurality of HRD parameters syntax structures (e.g., hrd_parameters( )) comprises a respective set of HRD parameters. Each respective syntax element of the array of syntax elements specifies an index of an HRD parameters syntax structure in the plurality of HRD parameters syntax structures.

Furthermore, in the example of FIG. 5, video encoder 20 generates an HEVC timing and HRD descriptor comprising a target schedule index syntax element (e.g., target_schedule_idx) indicating an index of a delivery schedule (202). Furthermore, video encoder 20 may generate a data stream (e.g., an MPEG-2 data stream) comprising a plurality of elementary streams and the HEVC timing and HRD descriptor (204). A set of parameters identifies a syntax element in the array of syntax elements that specifies an index of a particular HRD parameters syntax structure identified as being applicable to the particular elementary stream. In this example, the particular HRD parameters syntax structure is one of the plurality of HRD parameters syntax structures and the particular HRD parameters syntax structure is part of an operation point. The set of parameters may include a parameter (e.g., SchedSelCombIdx) having a value equal to a value of the target schedule index syntax element. Furthermore, in some examples, the set of parameters includes a second parameter (e.g., partitionIdx) whose value is determined in the manner shown in the example of FIG. 7. Additionally, the set of parameters may include a third, fourth, and fifth parameter. The third parameter (e.g., TargetOlsIdx) specifies a target output layer set index of an operation point. The fourth parameter (e.g., TargetPsIdx) specifies a target partitioning scheme index of the operation point, and the fifth parameter (e.g., HighestTid) specifies a highest temporal identifier of the operation point.

Figure 6:
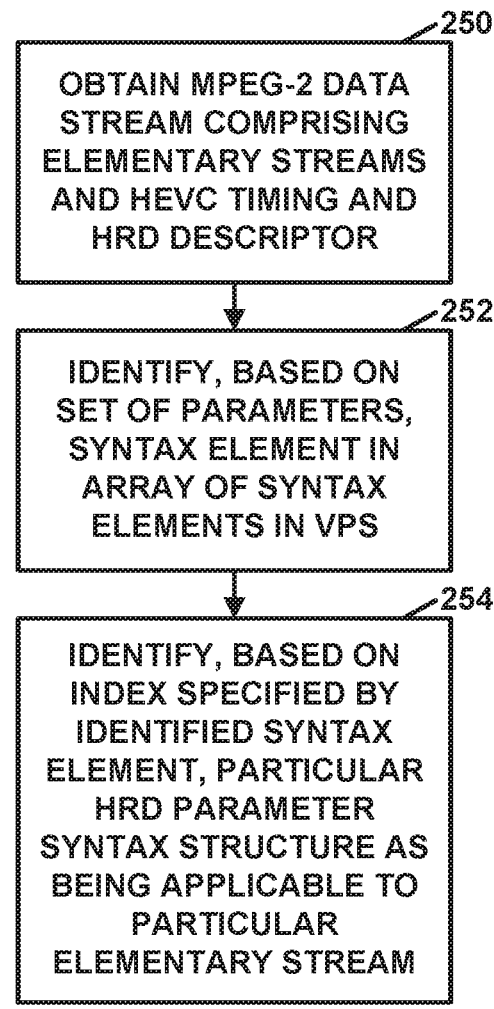
FIG. 6 is a flowchart illustrating an example operation of a video decoder, in accordance with a technique of this disclosure.

FIG. 6 is a flowchart illustrating an example operation of a video decoder, in accordance with a technique of this disclosure. In the example of FIG. 6, video decoder 30 obtains a data stream (e.g., an MPEG-2 data stream) comprising a plurality of elementary streams and an HEVC timing and HRD descriptor (250). The HEVC timing and HRD descriptor comprises a target schedule index syntax element (e.g., target_schedule_idx) indicating an index of a delivery schedule.

Furthermore, in the example of FIG. 6, video decoder 30 identifies, based on a set of parameters, a syntax element in an array of syntax elements (e.g., bsp_hrd_idx[TargetOlsIdx][TargetPsIdx][HighestTid][SchedSelCombIdx][partitionIdx]) in a VPS (252). In the example of FIG. 6, the VPS includes a plurality of HRD parameters syntax structures (e.g., hrd_parameters( )). Each respective HRD parameters syntax structure of the plurality of HRD parameters syntax structures comprises a respective set of HRD parameters (e.g., nal_hrd_parameters_present_flag, vcl_hrd_parameters_present_flag, etc.). Each respective syntax element of the array of syntax elements specifies an index of an HRD parameters syntax structure in the plurality of HRD parameters syntax structures. The set of parameters may include a parameter (e.g., SchedSelCombIdx) having a value equal to a value of the target schedule index syntax element. Furthermore, in some examples, the set of parameters includes a second parameter (e.g., partitionIdx) whose value is determined in the manner shown in the example of FIG. 7. Additionally, the set of parameters may include a third, fourth, and fifth parameter. The third parameter (e.g., TargetOlsIdx) specifies a target output layer set index of an operation point. The fourth parameter (e.g., TargetPsIdx) specifies a target partitioning scheme index of the operation point, and the fifth parameter (e.g., HighestTid) specifies a highest temporal identifier of the operation point.

Additionally, in the example of FIG. 6, video decoder 30 identifies, based on an index specified by the identified syntax element, a particular HRD parameters syntax structure in the plurality of HRD parameters syntax structures as being applicable to a particular elementary stream that is part of the operation point (254). The plurality of elementary streams includes the particular elementary stream.

Figure 7:
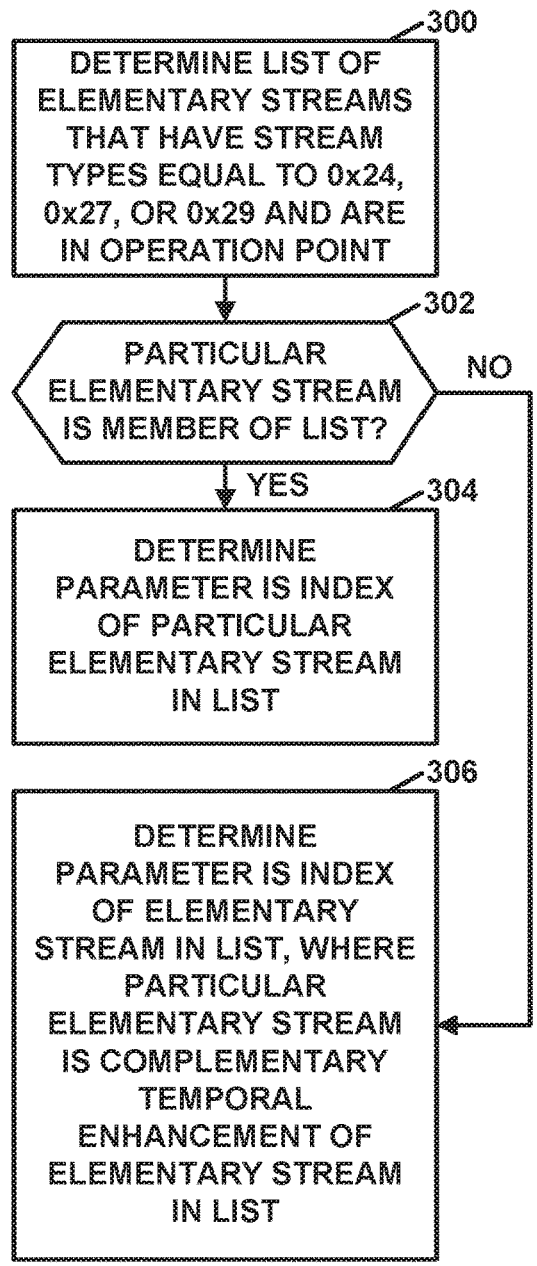
FIG. 7 is a flowchart illustrating an example operation of a video coder to determine a value of a parameter, in accordance with a technique of this disclosure.

FIG. 7 is a flowchart illustrating an example operation of a video coder to determine a value of a parameter, in accordance with a technique of this disclosure. In the example of FIG. 7, the video coder (e.g., video encoder 20 or video decoder 30) determines a list of elementary streams in the plurality of elementary streams that have stream types equal to 0x24, 0x27, or 0x29 and that are in an operation point (300). As indicated above, an elementary stream with a stream type equal to 0x24 is an HEVC video stream or an HEVC temporal video sub-bitstream or an HEVC base sub-partition. An elementary stream with a stream type equal to 0x27 is an HEVC enhancement sub-partition which includes TemporalId 0 of an HEVC video stream conforming to one or more profiles defined in Annex G of ITU-T Rec. H.265|ISO/IEC 23008-2. An elementary stream with a stream type equal to 0x29 is an HEVC enhancement sub-partition which includes TemporalId 0 of an HEVC video stream conforming to one or more profiles defined in Annex H of ITU-T Rec. H.265|ISO/IEC 23008-2.

In the example of FIG. 7, the list is in ascending order according to hierarchy layer index values for the elementary streams in the list. In instances where the video coder is a video encoder, the video encoder may, as part of generating the data stream, include, in the data stream, for each respective elementary stream of the plurality of elementary streams, a hierarchy descriptor or a hierarchy extension descriptor comprising a hierarchy layer index value (e.g., hierarchy_layer_index) for the respective elementary stream. In instances where the video coder is a video decoder, the video decoder may, as part of obtaining the data stream, obtain, for each respective elementary stream of the plurality of elementary streams, a hierarchy descriptor or a hierarchy extension descriptor comprising a hierarchy layer index value for the respective elementary stream.

Furthermore, in the example of FIG. 7, the video coder may determine whether the particular elementary stream is a member of the list (302). If the particular elementary stream is a member of the list ("YES" of 302), the video coder may determine the value of the parameter is the index of the particular elementary stream in the list (304). If the particular elementary stream is not a member of the list ("NO" of 302), the video coder may determine the value of the parameter is the index of one of the elementary streams in the list (306). The particular elementary stream is a complementary temporal enhancement of the elementary stream in the list.

While particular combinations of various aspects of the techniques are described above, these combinations are provided merely to illustrate examples of the techniques described in this disclosure. Accordingly, the techniques of this disclosure should not be limited to these example combinations and may encompass any conceivable combination of the various aspects of the techniques described in this disclosure.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of processing video data, the method comprising:
  obtaining a data stream comprising a plurality of elementary streams and a High Efficiency Video Coding (HEVC) timing and Hypothetical Reference Decoder (HRD) descriptor, wherein the HEVC timing and HRD descriptor comprises a target schedule index syntax element indicating an index of a delivery schedule;

identifying, based on a set of parameters, a syntax element in an array of syntax elements in a video parameter set (VPS), wherein:

the VPS comprises a plurality of HRD parameters syntax structures, wherein each respective HRD parameters syntax structure of the plurality of HRD parameters syntax structures comprises a respective set of HRD parameters, each respective syntax element of the array of syntax elements specifies an index of an HRD parameters syntax structure in the plurality of HRD parameters syntax structures, and the set of parameters comprises a parameter having a value equal to a value of the target schedule index syntax element; and identifying, based on an index specified by the identified syntax element, a particular HRD parameters syntax structure in the plurality of HRD parameters syntax structures as being applicable to a particular elementary stream that is part of the operation point, the plurality of elementary streams including the particular elementary stream.

2. The method of claim 1, wherein the parameter is a first parameter, the set of parameters includes a second parameter, and receiving the data stream comprises receiving, for each respective elementary stream of the plurality of elementary streams, a hierarchy descriptor or a hierarchy extension descriptor comprising a hierarchy layer index value for the respective elementary stream; and the method further comprising:

determining a list of elementary streams in the plurality of elementary streams that have stream types equal to 0x24, 0x27, or 0x29 and that are in the operation point, the list being in ascending order according to the hierarchy layer index value for the elementary streams in the list; and determining a value of the second parameter such that:

if the particular elementary stream is a member of the list, the value of the second parameter is the index of the particular elementary stream in the list, and if the particular elementary stream is not a member of the list, the value of the second parameter is the index of one of the elementary streams in the list, wherein the particular elementary stream is a complementary temporal enhancement of the elementary stream in the list.

3. The method of claim 2, wherein the set of parameters includes a third, fourth, and fifth parameter, the third parameter specifying a target output layer set index of an operation point, the fourth parameter specifying a target partitioning scheme index of the operation point, the fifth parameter specifying a highest temporal identifier of the operation point.

4. The method of claim 1, wherein the data stream is a program stream or a transport stream and is subject to a constraint that each of the plurality of elementary streams contains no more than one layer.

5. The method of claim 1, wherein the data stream is a program stream or transport stream and is subject to a constraint such that if an hrd_management_valid_flag of the HEVC timing and HRD descriptor is equal to 1, then buffering period Supplemental Enhancement Information (SEI) messages and picture timing SEI messages applicable for each operation point signaled in an HEVC operation descriptor shall be present in an HEVC video stream.

6. The method of claim 1, wherein the HEVC timing and HRD descriptor is a program level descriptor, wherein it is required that there is at most one HEVC timing and HRD descriptor in the data stream.

7. The method of claim 1, wherein the data stream is a Motion Picture Experts Group (MPEG)-2 data stream.

8. A method of processing video data, the method comprising:

generating a video parameter set (VPS) that includes an array of syntax elements and a plurality of Hypothetical Reference Decoder (HRD) parameters syntax structures, wherein:

each respective HRD parameters syntax structure of the plurality of HRD parameters syntax structures comprises a respective set of HRD parameters, and each respective syntax element of the array of syntax elements specifies an index of an HRD parameters syntax structure in the plurality of HRD parameters syntax structures;

generating a High Efficiency Video Coding (HEVC) timing and HRD descriptor comprising a target schedule index syntax element indicating an index of a delivery schedule; and generating a data stream comprising a plurality of elementary streams and the High Efficiency Video Coding (HEVC) timing and HRD descriptor, wherein a set of parameters identifies a syntax element in the array of syntax elements that specifies an index of a particular HRD parameters syntax structure applicable to the particular elementary stream, the particular HRD parameters syntax structure being one of the plurality of HRD parameters syntax structures, the particular HRD parameters syntax structure being part of an operation point, the set of parameters comprises a parameter having a value equal to a value of the target schedule index syntax element.

9. The method of claim 8, wherein the parameter is a first parameter, the set of parameters includes a second parameter, and generating the data stream comprises including, in the data stream, for each respective elementary stream of the plurality of elementary streams, a hierarchy descriptor or a hierarchy extension descriptor comprising a hierarchy layer index value for the respective elementary stream; and the method further comprising:

determining a list of elementary streams in the plurality of elementary streams that have stream types equal to 0x24, 0x27, or 0x29 and that are in the operation point, the list being in ascending order according to the hierarchy layer index value for the elementary streams in the list; and determining a value of the second parameter such that:

if the particular elementary stream is a member of the list, the value of the second parameter is the index of the particular elementary stream in the list, and if the particular elementary stream is not a member of the list, the value of the second parameter is the index of the elementary streams in the list, wherein the particular elementary stream is a complementary temporal enhancement of the elementary stream in the list.

10. The method of claim 9, wherein the set of parameters includes a third, fourth, and fifth parameter, the third parameter specifying a target output layer set index of an operation point, the fourth parameter specifying a target partitioning scheme index of the operation point, the fifth parameter specifying a highest temporal identifier of the operation point.

11. The method of claim 8, wherein the data stream is subject to a constraint that each of the plurality of elementary streams contains no more than one layer.

12. The method of claim 8, wherein the data stream is subject to a constraint such that if an hrd_management_valid_flag of the HEVC timing and HRD descriptor is equal to 1, then buffering period Supplemental Enhancement Information (SEI) messages and picture timing SEI messages applicable for each operation point signaled in a HEVC operation descriptor shall be present in an HEVC video stream.

13. The method of claim 8, wherein the HEVC timing and HRD descriptor is a program level descriptor, wherein it is required that there is at most one HEVC timing and HRD descriptor in the data stream.

14. The method of claim 8, wherein the data stream is a Motion Picture Experts Group (MPEG)-2 data stream.

15. A device for processing video data, the device comprising:
a memory configured to store the video data; and
one or more processors configured to:
obtain a data stream comprising a plurality of elementary streams and a High Efficiency Video Coding (HEVC) timing and Hypothetical Reference Decoder (HRD) descriptor, wherein the HEVC timing and HRD descriptor comprises a target schedule index syntax element indicating an index of a delivery schedule, the elementary streams comprising encoded representations of the video data;
identify, based on a set of parameters, a syntax element in an array of syntax elements in a video parameter set (VPS), wherein:
the VPS comprises a plurality of HRD parameters syntax structures, wherein each respective HRD parameters syntax structure of the plurality of HRD parameters syntax structures comprises a respective set of HRD parameters,
each respective syntax element of the array of syntax elements specifies an index of an HRD parameters syntax structure in the plurality of HRD parameters syntax structures, and
the set of parameters comprises a parameter having a value equal to a value of the target schedule index syntax element; and
identify, based on an index specified by the identified syntax element, a particular HRD parameters syntax structure in the plurality of HRD parameters syntax structures as being applicable to a particular elementary stream that is part of the operation point, the plurality of elementary streams including the particular elementary stream.

16. The device of claim 15,
wherein the parameter is a first parameter, the set of parameters includes a second parameter, and obtaining the data stream comprises obtaining, for each respective elementary stream of the plurality of elementary streams, a hierarchy descriptor or a hierarchy extension descriptor comprising a hierarchy layer index value for the respective elementary stream; and
the one or more processors further configured to:
determine a list of elementary streams in the plurality of elementary streams that have stream types equal to 0x24, 0x27, or 0x29 and that are in the operation point, the list being in ascending order according to the hierarchy layer index value for the elementary streams in the list; and
determine a value of the second parameter such that:
if the particular elementary stream is a member of the list, the value of the second parameter is the index of the particular elementary stream in the list, and
if the particular elementary stream is not a member of the list, the value of the second parameter is the index of one of the elementary streams in the list, wherein the particular elementary stream is a complementary temporal enhancement of the elementary stream in the list.

17. The device of claim 16, wherein the set of parameters includes a third, fourth, and fifth parameter, the third parameter specifying a target output layer set index of an operation point, the fourth parameter specifying a target partitioning scheme index of the operation point, the fifth parameter specifying a highest temporal identifier of the operation point.

18. The device of claim 15, wherein the data stream is a program stream or a transport stream and is subject to a constraint that each of the plurality of elementary streams contains no more than one layer.

19. The device of claim 15, wherein the data stream is a program stream or transport stream and is subject to a constraint such that if an hrd_management_valid_flag of the HEVC timing and HRD descriptor is equal to 1, then buffering period Supplemental Enhancement Information (SEI) messages and picture timing SEI messages applicable for each operation point signaled in an HEVC operation descriptor shall be present in an HEVC video stream.

20. The device of claim 15, wherein the HEVC timing and HRD descriptor is a program level descriptor, wherein it is required that there is at most one HEVC timing and HRD descriptor in the data stream.

21. The device of claim 15, wherein the data stream is a Motion Picture Experts Group (MPEG)-2 data stream.

22. A device for processing video data, the device comprising:
a memory configured to store the video data; and
one or more processors configured to:
generate a video parameter set (VPS) that includes an array of syntax elements and a plurality of Hypothetical Reference Decoder (HRD) parameters syntax structures, wherein:
each respective HRD parameters syntax structure of the plurality of HRD parameters syntax structures comprises a respective set of HRD parameters, and
each respective syntax element of the array of syntax elements specifies an index of an HRD parameters syntax structure in the plurality of HRD parameters syntax structures;
generate a High Efficiency Video Coding (HEVC) timing and HRD descriptor comprising a target schedule index syntax element indicating an index of a delivery schedule; and
generate a data stream comprising a plurality of elementary streams and the High Efficiency Video Coding (HEVC) timing and HRD descriptor, the plurality of elementary streams comprising an encoded representation of the video data, wherein a set of parameters identifies a syntax element in the array of syntax elements that specifies an index of a particular HRD parameters syntax structure applicable to the particular elementary stream, the particular HRD parameters syntax structure being one of the plurality of HRD parameters syntax structures, the particular HRD parameters syntax structure being part of an operation point, the set of parameters comprises a parameter having a value equal to a value of the target schedule index syntax element.

23. The device of claim 22, wherein the parameter is a first parameter, the set of parameters includes a second parameter, and the one or more processors are configured to:

include, in the data stream, for each respective elementary stream of the plurality of elementary streams, a hierarchy descriptor or a hierarchy extension descriptor comprising a hierarchy layer index value for the respective elementary stream; and determine a list of elementary streams in the plurality of elementary streams that have stream types equal to 0x24, 0x27, or 0x29 and that are in the operation point, the list being in ascending order according to the hierarchy layer index value for the elementary streams in the list; and determine a value of the second parameter such that:

if the particular elementary stream is a member of the list, the value of the second parameter is the index of the particular elementary stream in the list, and if the particular elementary stream is not a member of the list, the value of the second parameter is the index of one of the elementary streams in the list, wherein the particular elementary stream is a complementary temporal enhancement of the elementary stream in the list.

24. The device of claim 23, wherein the set of parameters includes a third, fourth, and fifth parameter, the third parameter specifying a target output layer set index of an operation point, the fourth parameter specifying a target partitioning scheme index of the operation point, the fifth parameter specifying a highest temporal identifier of the operation point.

25. The device of claim 22, wherein the data stream is subject to a constraint that each of the plurality of elementary streams contains no more than one layer.

26. The device of claim 22, wherein the data stream is subject to a constraint such that if an hrd_management_valid_flag of the HEVC timing and HRD descriptor is equal to 1, then buffering period Supplemental Enhancement Information (SEI) messages and picture timing SEI messages applicable for each operation point signaled in a HEVC operation descriptor shall be present in an HEVC video stream.

27. The device of claim 22, wherein the HEVC timing and HRD descriptor is a program level descriptor, wherein it is required that there is at most one HEVC timing and HRD descriptor in the data stream.

28. The device of claim 22, wherein the data stream is a Motion Picture Experts Group (MPEG)-2 data stream.

* * * * *